(12) United States Patent
Mishra et al.

(10) Patent No.: US 11,097,856 B1
(45) Date of Patent: Aug. 24, 2021

(54) DETERMINING INTEGRITY OF ACOUSTICALLY EXCITED OBJECTS

(71) Applicant: Amazon Technologies, Inc., Seattle, WA (US)

(72) Inventors: Pragyana K. Mishra, Seattle, WA (US); Gur Kimchi, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 16/838,695

(22) Filed: Apr. 2, 2020

Related U.S. Application Data

(63) Continuation of application No. 16/278,397, filed on Feb. 18, 2019, now Pat. No. 10,611,497.

(51) Int. Cl.
| | |
|---|---|
| *B64D 47/08* | (2006.01) |
| *H04N 7/18* | (2006.01) |
| *B64C 27/08* | (2006.01) |
| *B64C 39/02* | (2006.01) |

(52) U.S. Cl.
CPC ............ *B64D 47/08* (2013.01); *B64C 27/08* (2013.01); *B64C 39/024* (2013.01); *H04N 7/185* (2013.01); *B64C 2201/127* (2013.01)

(58) Field of Classification Search
CPC ....... B64D 47/08; B64C 39/024; B64C 27/08; B64C 2201/127; H04N 7/185
USPC ......................................................... 348/144
See application file for complete search history.

(56) References Cited

U.S. PATENT DOCUMENTS

| | | | |
|---|---|---|---|
| 4,895,448 A | 1/1990 | Laird | |
| 6,360,193 B1 | 3/2002 | Stoyen | |
| 6,622,135 B1 | 9/2003 | Tremiolles et al. | |
| 9,404,899 B1 | 8/2016 | Konopka et al. | |
| 10,053,236 B1 | 8/2018 | Buchmueller et al. | |
| 10,112,730 B2* | 10/2018 | Ismail | B64C 39/024 |
| 10,496,893 B2 | 12/2019 | Diamond et al. | |
| 2004/0141175 A1 | 7/2004 | Baldwin et al. | |

(Continued)

OTHER PUBLICATIONS

A. Krizhevsky, I. Sutskever, and G. E Hinton. Imagenet classification with deep convolutional neural networks. NIPS 12 Proceedings of the 25th Int'l Conference on Neural Information Processing Systems (vol. 1), Lake Tahoe, Nevada, pp. 1097-1105, 2012.

(Continued)

*Primary Examiner* — Susan E. Hodges
(74) *Attorney, Agent, or Firm* — Athorus, PLLC

(57) ABSTRACT

A vibrometric signature for a vehicle, or a set of one or more frequencies where vibration of the vehicle is naturally observed in the presence of excitation, may be generated and used to make one or more determinations regarding the integrity or suitability of the vehicle for one or more missions. When the vehicle is subjected to excitation over a range of frequencies, images of the vehicle are captured, and power levels of vibrations of the vehicle are calculated based on the images. A vibrometric signature is generated based on the power levels of the vibrations, and compared to vibrometric signatures previously generated for the aerial vehicle, or to vibrometric signatures associated with one or more other vehicles, or anomalies experienced by such other vehicles, to determine whether the vehicle may be cleared for the performance of one or more missions, or whether maintenance or inspections are required.

20 Claims, 22 Drawing Sheets

(56) References Cited

U.S. PATENT DOCUMENTS

| | | |
|---|---|---|
| 2007/0280501 A1 | 12/2007 | Walton |
| 2010/0235037 A1 | 9/2010 | Vian et al. |
| 2011/0063950 A1 | 3/2011 | Greenleaf et al. |
| 2012/0250010 A1 | 10/2012 | Hannay |
| 2014/0067164 A1 | 3/2014 | Papadopoulos et al. |
| 2015/0336671 A1 | 11/2015 | Winn et al. |
| 2015/0346107 A1 | 12/2015 | Kim et al. |
| 2015/0355101 A1 | 12/2015 | Sun |
| 2016/0003954 A1 | 1/2016 | Broussard et al. |
| 2016/0093124 A1 | 3/2016 | Shi et al. |
| 2016/0245279 A1 | 8/2016 | Pal et al. |
| 2016/0264262 A1 | 9/2016 | Colin et al. |
| 2016/0376031 A1 | 12/2016 | Michalski et al. |
| 2016/0379154 A1 | 12/2016 | Rodoni |
| 2017/0308802 A1 | 10/2017 | Ramsøy et al. |
| 2017/0328838 A1 | 11/2017 | Umehara |
| 2018/0068433 A1 | 3/2018 | Imakoga |
| 2018/0322366 A1 | 11/2018 | Lim et al. |
| 2018/0342069 A1 | 11/2018 | Lim et al. |
| 2018/0346151 A1 | 12/2018 | Sturlaugson et al. |
| 2019/0012579 A1 | 1/2019 | Namiki |
| 2019/0033124 A1 | 1/2019 | Mukherjee et al. |
| 2019/0228667 A1 | 7/2019 | Matsumoto et al. |
| 2020/0180791 A1 | 6/2020 | Kimberly et al. |

OTHER PUBLICATIONS

A. Radford, L. Metz, and S. Chintala. Unsupervised Representation Learning with Deep Convolutional Generative Adversarial Networks. Submitted as Conference Paper for ICLR 2016, San Juan, Puerto Rico, May 2-4, 2016.

A. Shrivastava, T. Pfister, O. Tuzel, J. Susskind, W. Wang, and R. Webb. Learning from Simulated and Unsupervised Images through Adversarial Training. Submitted Nov. 15, 2016, for oral presentation at Conference on Computer Vision and Pattern Recognition (CVPR 2017), Honolulu, Hawaii; presented at CVPR 2017 on Jul. 23, 2017.

B. Zhou, A. Khosla, A. Lapedriza, A. Oliva, and A. Torralba. Learning Deep Features for Discriminative Localization. In Proceedings of the IEEE Conference on Computer Vision and Pattern Recognition (CVPR 2016), Las Vegas, Nevada, pp. 2921-2929, IEEE 2016.

D. Soukup and R. Huber-Mörk. Convolutional Neural Networks for Steel Surface Defect Detection from Photometric Stereo Images, pp. 668-677. Advances in Visual Computing, 10th Int'l Symposium (ISVC 2014), Las Vegas, Nevada, Dec. 8-10, 2014. Springer International Publishing, Switzerland, 2014 (LNCS 8887).

D. Kingma and J. Ba. Adam: A Method for Stochastic Optimization, The Hebrew University of Jerusalem, Advanced Seminar in Deep Learning, Oct. 18, 2015.

D. Kingma and J. Ba. Adam: A method for stochastic optimization. Published at the 3rd International Conference for Learning Representations (ICLR 2015), San Diego, May 9, 2015.

D. Martin. A Practical Guide to Machine Vision Lighting, Advanced Illumination, Rochester, Vt., Feb. 2012.

D. Mery and M.A. Berti. Automatic Detection of Welding Defects Using Texture Features. Insight-Non- Destructive Testing and Condition Monitoring, 45(10):676-681, 2003. Presented at Int'l Symposium on Computed Tomography and Image Processing for Industrial Radiology, Berlin, Germany, Jun. 23-25, 2003.

D. Sammons, W.P. Winfree, E. Burke, and S. Ji. Segmenting delaminations in carbon fiber reinforced polymer composite CT using convolutional neural networks. AIP Conference Proceedings, vol. 1706, p. 110014. American Institute of Physics, AIP Publishing, 2016.

D. Vernon. Machine Vision: Automated Visual Inspection and Robot Vision. Automatica, vol. 30, No. 4, pp. 731-732 (1994), Elsevier Science, Ltd., Great Britain.

D. Wang, A. Khosla, R. Gargeya, H. Irshad, and A. H. Beck. Deep Learning for Identifying Metastatic Breast Cancer. Computer Research Repository (CoRR), Jun. 18, 2016.

Freeman, William T., and Adelson, Edward H. "The Design and Use of Steerable Filters," IEEE Transactions on Pattern Analysis and Machine Intelligence, vol. 13, No. 9, Sep. 1991, 16 pages.

G. Wang and T. Liao. Automatic identification of different types of welding defects in radiographic images. NDT&E International, 35(8):519-528 (2002), Elsevier Science Ltd., Great Britain.

H. Raafat and S. Taboun. An Integrated Robotic and Machine Vision System for Surface Flaw Detection and Classification. Computers & Industrial Engineering, Elsevier Science Ltd., Great Britain, 30(1):27-40, 1996.

I. Goodfellow, J. Pouget-Abadie, M. Mirza, B. Xu, D. Warde-Farley, S. Ozair, A. Courville, and Y. Ben-gio. Generative adversarial nets. Advances in Neural Information Processing Systems (NIPS 2014), pp. 2672-2680, 2014.

J. Deng, W. Dong, R. Socher, L.-J. Li, K. Li, and L. Fei-Fei. Imagenet: A large-scale hierarchical image database. In IEEE Conference on Computer Vision and Pattern Recognition, 2009 (CVPR 2009), Miami, Florida, pp. 248-255. IEEE 2009.

J. Long, E. Shelhamer, and T. Darrell. Fully Convolutional Networks for Semantic Segmentation. In Proceedings of the IEEE Conference on Computer Vision and Pattern Recognition (CVPR 2015), Boston, Mass., pp. 3431-3440, IEEE 2015.

J. Masci, U. Meier, D. Ciresan, J. Schmidhuber, and G. Fricout. Steel Defect Classification with Max-Pooling Convolutional Neural Networks. The 2012 International Joint Conference on Neural Networks (IJCCN), Brisbane, Australia, pp. 1-6. IEEE, Jun. 2012.

J. Redmon, S. Divvala, R. Girshick, and A. Farhadi. You Only Look Once: Unified, Real-Time Object Detection. Proceedings of the 2016 IEEE Conference on Computer Vision and Pattern Recognition (CVPR 2016), Las Vegas, Nevada, pp. 779-788, IEEE 2016.

K. He, X. Zhang, S. Ren, and J. Sun. Deep Residual Learning for Image Recognition. In Proceedings of the IEEE Conference on Computer Vision and Pattern Recognition (CVPR 2016), Las Vegas, Nevada, pp. 770-778, IEEE 2016.

K. Simonyan and A. Zisserman. Very Deep Convolutional Networks for Large-Scale Image Recognition. Submitted Sep. 4, 2014, for publication at 3d Int'l Conference on Learning Representations (ICLR 2015), San Diego, California. Presented May 7-9, 2015.

N. Srivastava, G. E. Hinton, A. Krizhevsky, I. Sutskever, and R. Salakhutdinov. Dropout: A Simple Way to Prevent Neural Networks from Overfitting. Journal of Machine Learning Research, 15(1):1929-1958, 2014.

S. Ioffe and C. Szegedy. Batch normalization: Accelerating deep network training by reducing internal covariate shift. In Proceedings of the 32nd International Conference on Machine Learning, Lille, France, pp. 448-456, 2015.

T.-Y. Lin, A. RoyChowdhury, and S. Maji. Bilinear CNN Models for Fine-Grained Visual Recognition. Proceedings of the 2015 IEEE International Conference on Computer Vision (ICCV), Santiago, Chile, pp. 1449-1457, IEEE 2015.

T.-Y. Lin, P. Goyal, R. Girshick, K. He, and P. Dollar. Focal Loss for Dense Object Detection. IEEE International Conference on Computer Vision (2017), pp. 966-974, IEEE 2017.

Wadhwa, N., Rubinstein, M., Durand, F., and Freeman, W.T. "Phase-Based Video Motion Processing," MIT Computer Science & Artificial Intelligence Lab, ACM Transactions on Graphics, vol. 32, issue 4, New York, N.Y., Jul. 2013, 9 pages.

Wu, H.-Y., Rubinstein, M., Shih, E., Guttag, J., Durand, F., Freeman, W. "Eulerian Video Magnification for Revealing Subtle Changes in the World," ACM Transactions on Graphics, vol. 31, No. 4, New York, N.Y., Jul. 2012, 8 pages.

Y. Gao, O. Beijbom, N. Zhang, and T. Darrell. Compact bilinear pooling. In Proceedings of the IEEE Conference on Computer Vision and Pattern Recognition (CVPR 2016), Las Vegas, Nevada, pp. 317-326, IEEE 2016.

Y. Liu, K. Gadepalli, M. Norouzi, G.E. Dahl, T. Kohlberger, A. Boyko, S. Venugopalan, A. Timofeev, P.Q. Nelson, G.S. Corrado, et al. Detecting Cancer Metastases on Gigapixel Pathology Images. Google Research, Mar. 8, 2017.

* cited by examiner

VIBRATION INDUCED BY ACOUSTIC EXCITATION
AT NATURAL FREQUENCY $f_N$

VIBRATION OF MOTOR MOUNT
DETECTED IN IMAGING DATA

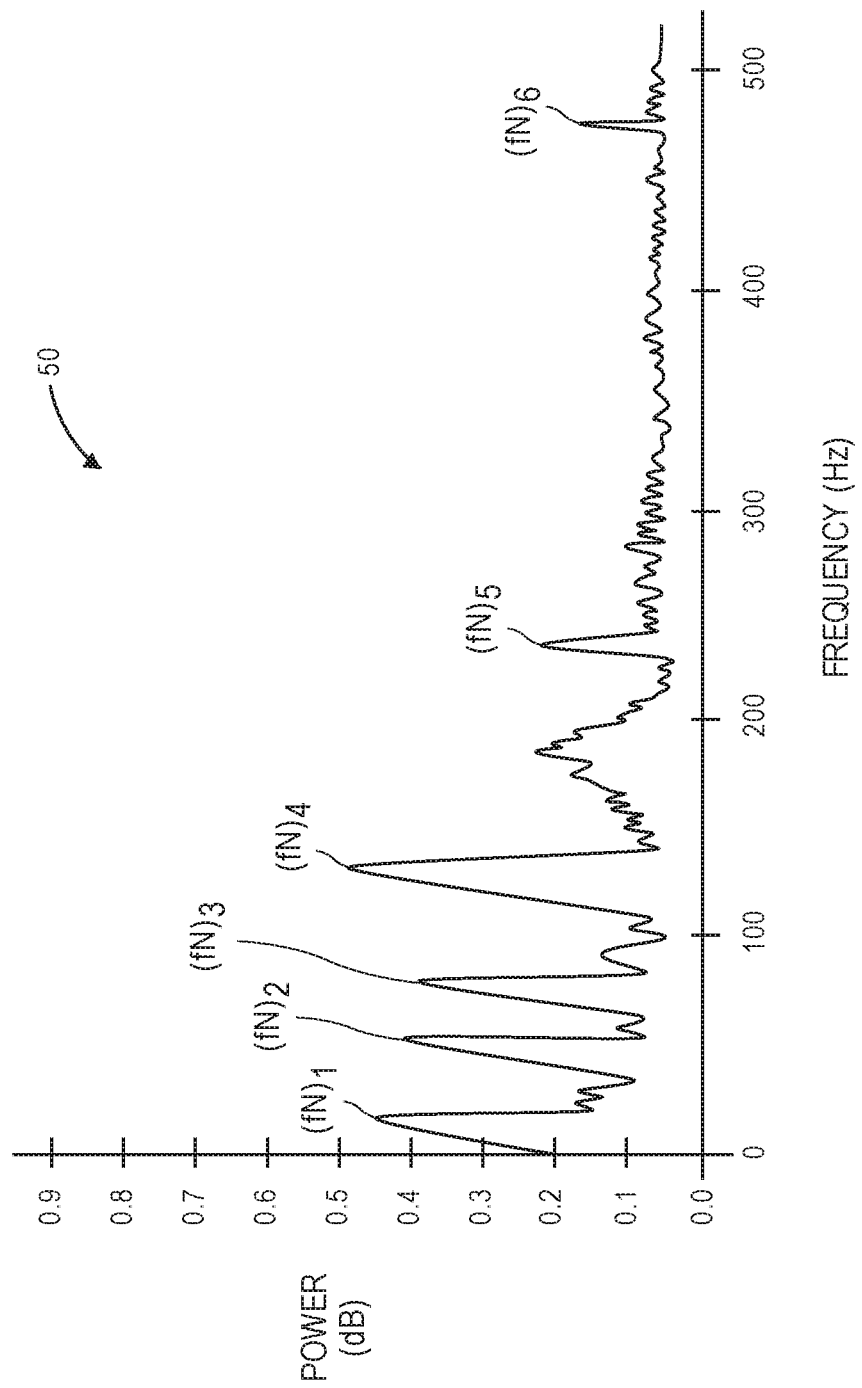

US 11,097,856 B1

DETERMINING INTEGRITY OF ACOUSTICALLY EXCITED OBJECTS

CROSS-REFERENCE TO RELATED APPLICATIONS

This application is a continuation of U.S. patent application Ser. No. 16/278,397, filed Feb. 18, 2019, the contents of which are incorporated by reference herein in their entirety.

BACKGROUND

Aerial vehicles such as airplanes or helicopters are commonly used to transport people or cargo from origins to destinations by air. Aerial vehicles may be formed from lightweight metals, plastics or composites and equipped with motors, rotors or other systems that are designed to meet or exceed a number of operational constraints or requirements including speed, altitude or lift. For example, many aerial vehicles (such as UAVs, or drones) are built from molded plastic frames and outfitted with electric motors powered by onboard batteries or other power sources that permit the vehicles to conduct lifting or thrusting operations, while larger aerial vehicles such as jumbo jets feature aluminum, titanium or carbon fiber frames and skins and are equipped with petroleum-powered jet engines capable of generating tens of thousands of pounds-force.

A manufactured aircraft tends to vibrate in a set of preferred modes, one or more of which may be commonly identified by an associated set of natural frequencies of vibration, or frequencies at which resonance occurs, and comparatively large-scale vibrations are observed. The discrete natural frequencies of a set that are associated with a specific aircraft necessarily depend upon structural properties (e.g., geometrical and material properties) of the aircraft. When an aircraft is built according to design specifications, the aircraft may be expected at have a known or predictable set of natural frequencies of vibration. Because an aircraft's natural frequencies of vibration depend upon its structural properties such as geometry, stiffness or damping, or the placement of individual components, each aircraft has a unique set of natural frequencies of its vibrational modes. Moreover, an aircraft's natural frequencies of vibration may change over time for any number of reasons or according to any number of factors. For example, where an aircraft's structural properties are modified due to wear and tear, damage, construction anomalies, operating histories or conditions (e.g., varying weight distributions, motor operations, or configurations of appurtenances such as landing skids), or simply due to settling of its components under vibration, displacement, stress, or forces, the set of natural frequencies of vibration of that aircraft are likewise subject to change.

BRIEF DESCRIPTION OF THE DRAWINGS

FIGS. 5A through 5C are views of aspects of one system for determining vehicle integrity using vibrometric signatures in accordance with embodiments of the present disclosure.

DETAILED DESCRIPTION

As is set forth in greater detail below, the present disclosure is directed to determining a vibrometric signature of a vehicle (e.g., a set of one or more frequencies where vibration of the vehicle is naturally observed), and using the vibrometric signature to make one or more determinations regarding the integrity or suitability of the vehicle. More specifically, the systems and methods of the present disclosure are directed to imparting excitation upon a vehicle such as an unmanned aerial vehicle, or drone, or component thereof, e.g., by subjecting the vehicle or component to excitation at varying frequencies, and capturing imaging data regarding one or more portions of the vehicle. Using the imaging data, frequencies at which the vehicle naturally vibrates when subjected to the excitation may be determined. A vibrometric signature for the vehicle is determined based on a set of frequencies at which vibrations are naturally observed when subject to excitation. One or more vibrometric signatures may be determined for a vehicle when the vehicle is operating or configured in any number of conditions. When a vibrometric signature is determined for a vehicle, information or data regarding the integrity or suitability of the vehicle may be derived by comparing the vibrometric signature to one or more other vibrometric signatures determined for the vehicle, or for one or more other vehicles.

Figure 1A:
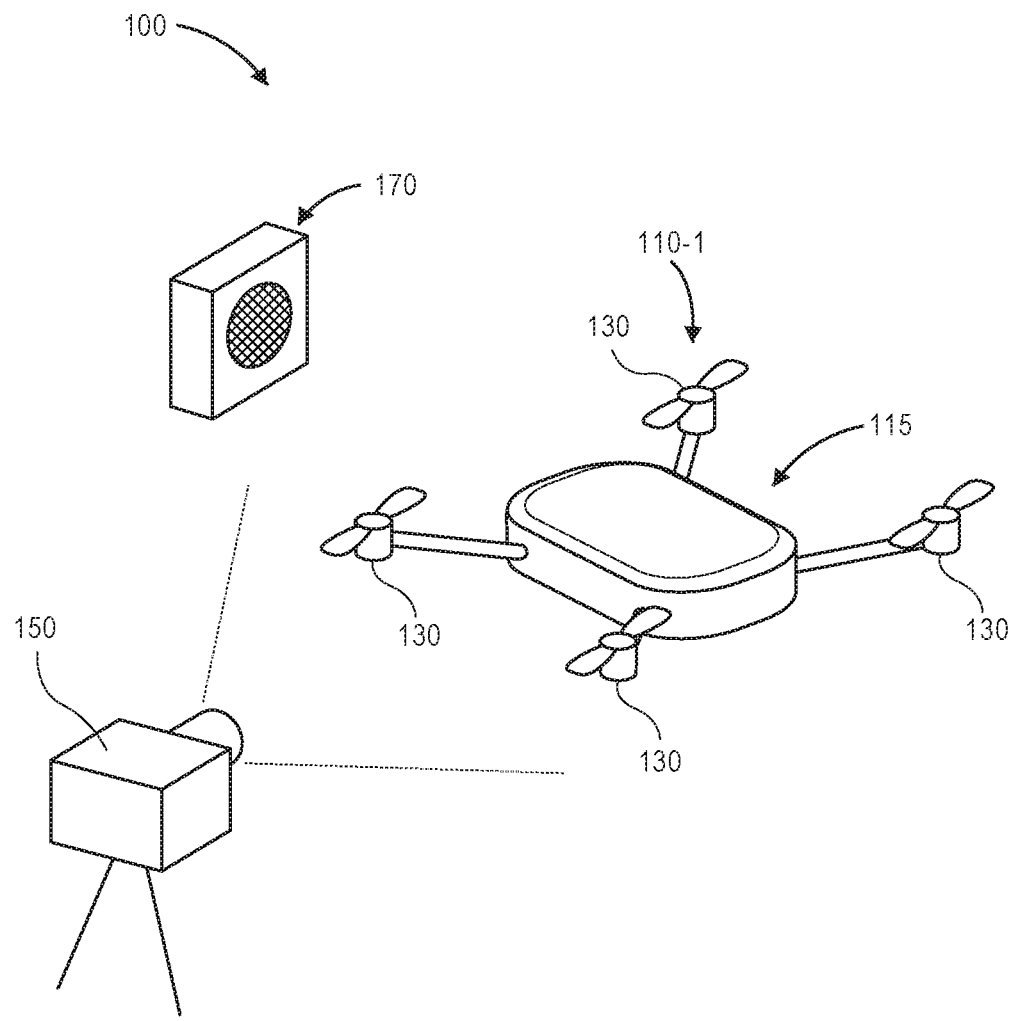
FIGS. 1A through 1E are views of aspects of one system for determining vehicle integrity using vibrometric signatures in accordance with embodiments of the present disclosure.

Referring to FIGS. 1A through 1E, views of aspects of one system 100 for determining vehicle integrity using vibrometric signatures in accordance with embodiments of the present disclosure are shown. As is shown in FIG. 1A, the system 100 includes an aerial vehicle 110-1 (e.g., an unmanned aerial vehicle, or drone), an imaging device 150 (e.g., a digital camera) and an acoustic speaker 170 (or another excitation source). The aerial vehicle 110-1 includes a frame 115 having a plurality of motors 130 coupled thereto. Each of the motors 130 is coupled to a propeller or other rotor by a drive shaft and configured to rotate the propeller about an axis defined by the drive shaft. The imaging device 150 is aligned to include all or portions of the aerial vehicle 110-1 within a field of view. The acoustic speaker 170 is also aligned to project acoustic energy in the form of sounds having any frequency, wavelength or intensity upon one or more portions of the aerial vehicle 110-1. Alternatively, any excitation source that is configured to excite the aerial vehicle 110-1 at known, selected frequencies with the aerial vehicle 110-1 within a field of view of the imaging device 150, e.g., by direct contact with the aerial vehicle 110-1 or in any other manner, may be utilized to impart excitation upon the aerial vehicle 110-1. For example, in some embodiments, one or more of the motors 130 may act as an excitation source for the aerial vehicle 110-1, where such motors 130 may be specifically controlled to impart excitation upon the aerial vehicle 110-1 at one or more selected frequencies within a known, defined range.

Figure 1B:
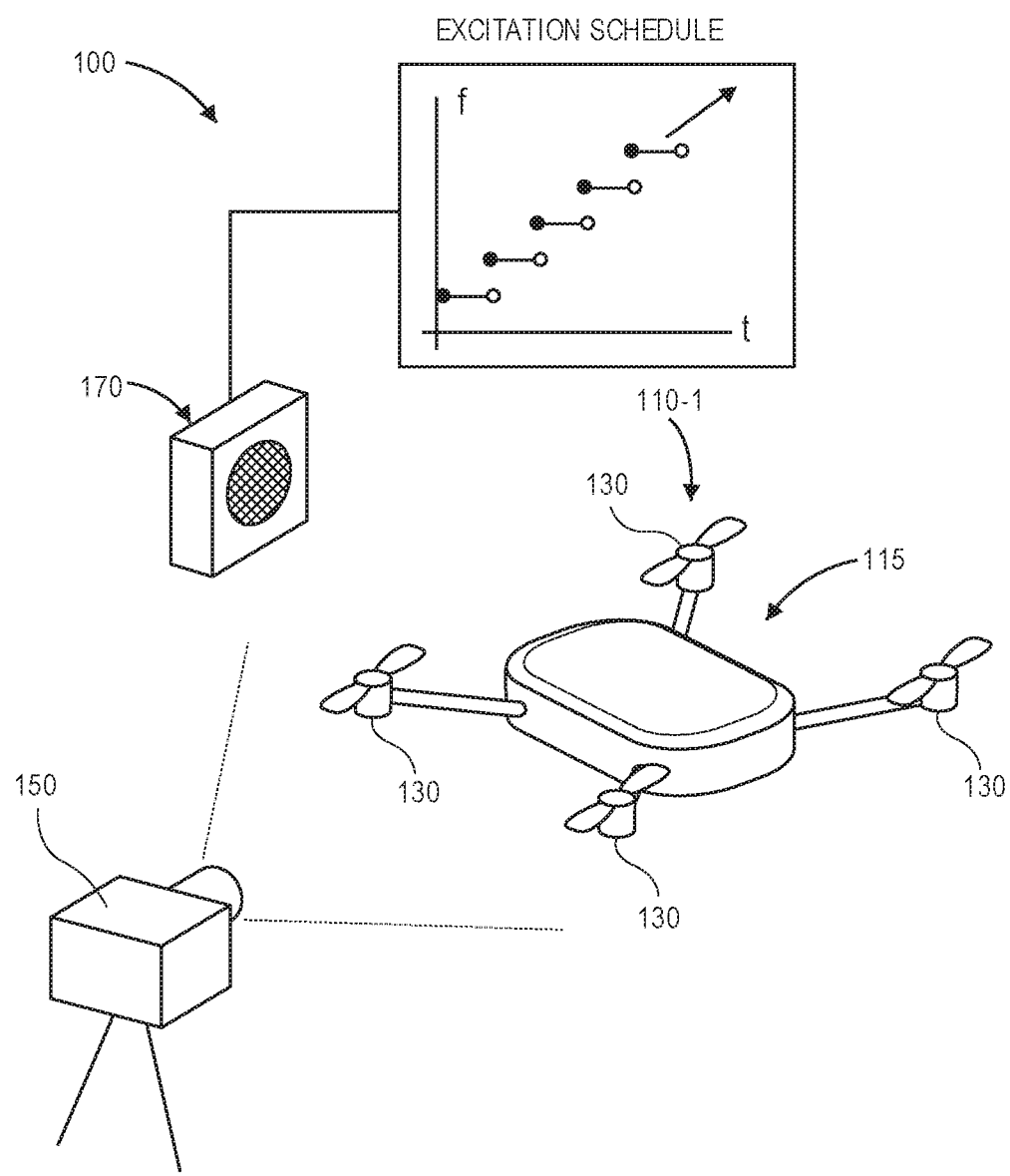

In accordance with some embodiments of the present disclosure, an object, such as the aerial vehicle, may be subjected to excitation by acoustic energy (e.g., sound) or other energy over a range of frequencies, and imaging data captured of the vehicle while the vehicle is subjected to the excitation may be processed to determine one or more natural frequencies of vibration for the object. As is shown in FIG. 1B, the acoustic speaker 170 may be programmed with an excitation schedule or other set of instructions by which acoustic energy may be projected at constant or varying intensities and over a defined range of frequencies, such as from zero hertz to five hundred hertz (0 to 500 Hz), from zero hertz to two thousand hertz (0 to 2000 Hz) in a stepwise manner, or over any other ranges of frequencies. For example, the acoustic speaker 170 may be programmed to emit acoustic energy according to a step function, a delta function, or in any other manner. The acoustic speaker 170 may excite the aerial vehicle 110-1 by acoustic energy at a selected frequency for a predetermined period of time to enable imaging data to be captured and/or processed using the imaging device 150, before exciting the aerial vehicle 110-1 at another selected frequency.

Figure 1C:
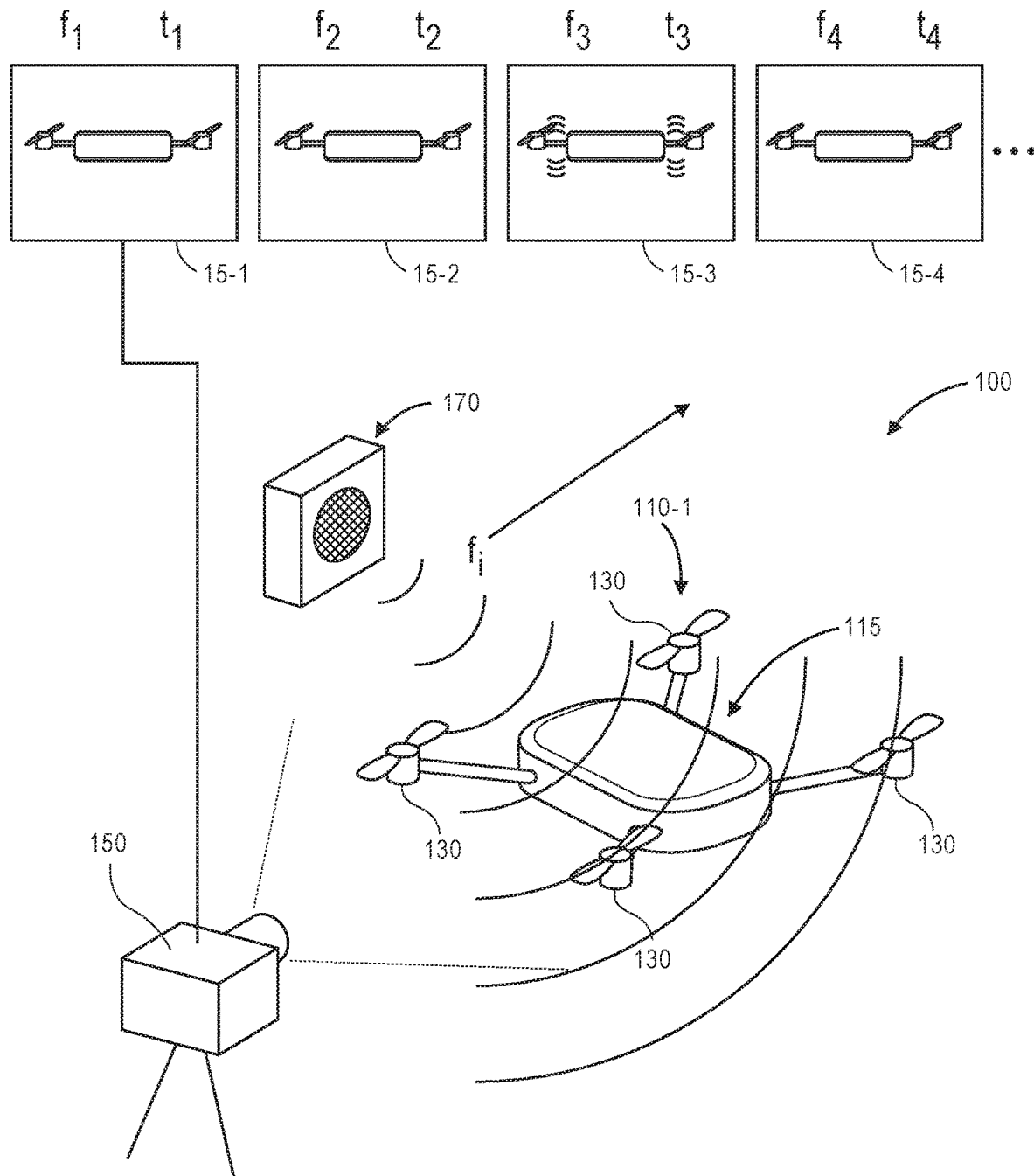

As is shown in FIG. 1C, the acoustic speaker 170 imparts acoustic energy upon the aerial vehicle 110-1 in accordance with the excitation schedule of FIG. 1B, e.g., with linearly increasing frequencies according to a step function, as a plurality of images 15-1, 15-2, 15-3, 15-4 are captured of the aerial vehicle 110-1. As is also shown in FIG. 1C, the images 15-1, 15-2, 15-3, 15-4 are captured at times $t_1$, $t_2$, $t_3$, $t_4$ when the aerial vehicle 110-1 is being excited by acoustic energy having frequencies $f_1$, $f_2$, $f_3$, $f_4$. The frame rate at which the images 15-1, 15-2, 15-3, 15-4 are captured is preferably at least twice a maximum frequency of the acoustic excitation, or at least as great as a Nyquist frequency for the imaging device 150.

Figure 1D:
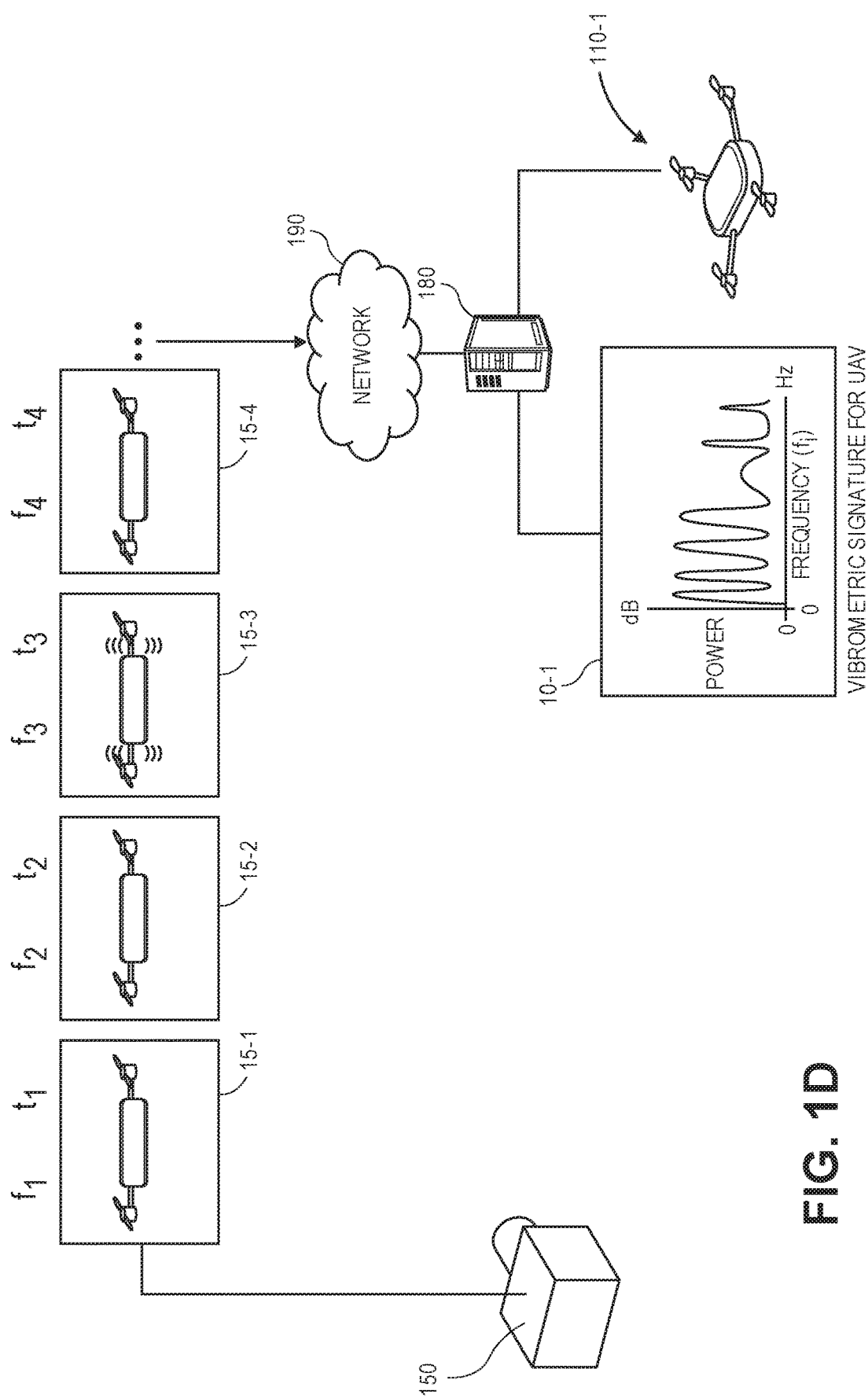

As is shown in FIG. 1D, the images 15-1, 15-2, 15-3, 15-4 captured using the imaging device 150 may be transmitted to a server 180 over a network 190. The server 180 may process the images 15-1, 15-2, 15-3, 15-4 to determine the extent to which the aerial vehicle 110-1 vibrates in response to the acoustic excitation. For example, the server 180 may process the images 15-1, 15-2, 15-3, 15-4 according to one or more optical flow methods or techniques to detect small movements of pixels corresponding to surfaces of the aerial vehicle 110-1 within the respective images 15-1, 15-2, 15-3, 15-4. Alternatively, any other methods or techniques may be used to determine the extent of movement of such pixels within the respective images 15-1, 15-2, 15-3, 15-4. For example, the images 15-1, 15-2, 15-3, 15-4 may be processed using a steerable filter-based method, e.g., by breaking down each of the images 15-1, 15-2, 15-3, 15-4 into amplitudes and phases at different scales and orientations, for each of a plurality of frequencies. A power level (or energy level) associated with the vibration may be calculated for each of the frequencies. Where power levels or deviations in position at a given frequency exceed a predetermined threshold, or are significantly greater than power levels or deviations in position at other frequencies, a natural frequency of vibration may be identified. In accordance with embodiments of the present disclosure, a vibrometric signature 10-1 may be generated based on a set of natural frequencies of vibration for a given object, such as the aerial vehicle 110-1, based on such power levels or deviations in position and frequencies at which such power levels or deviations were observed.

Figure 1E:
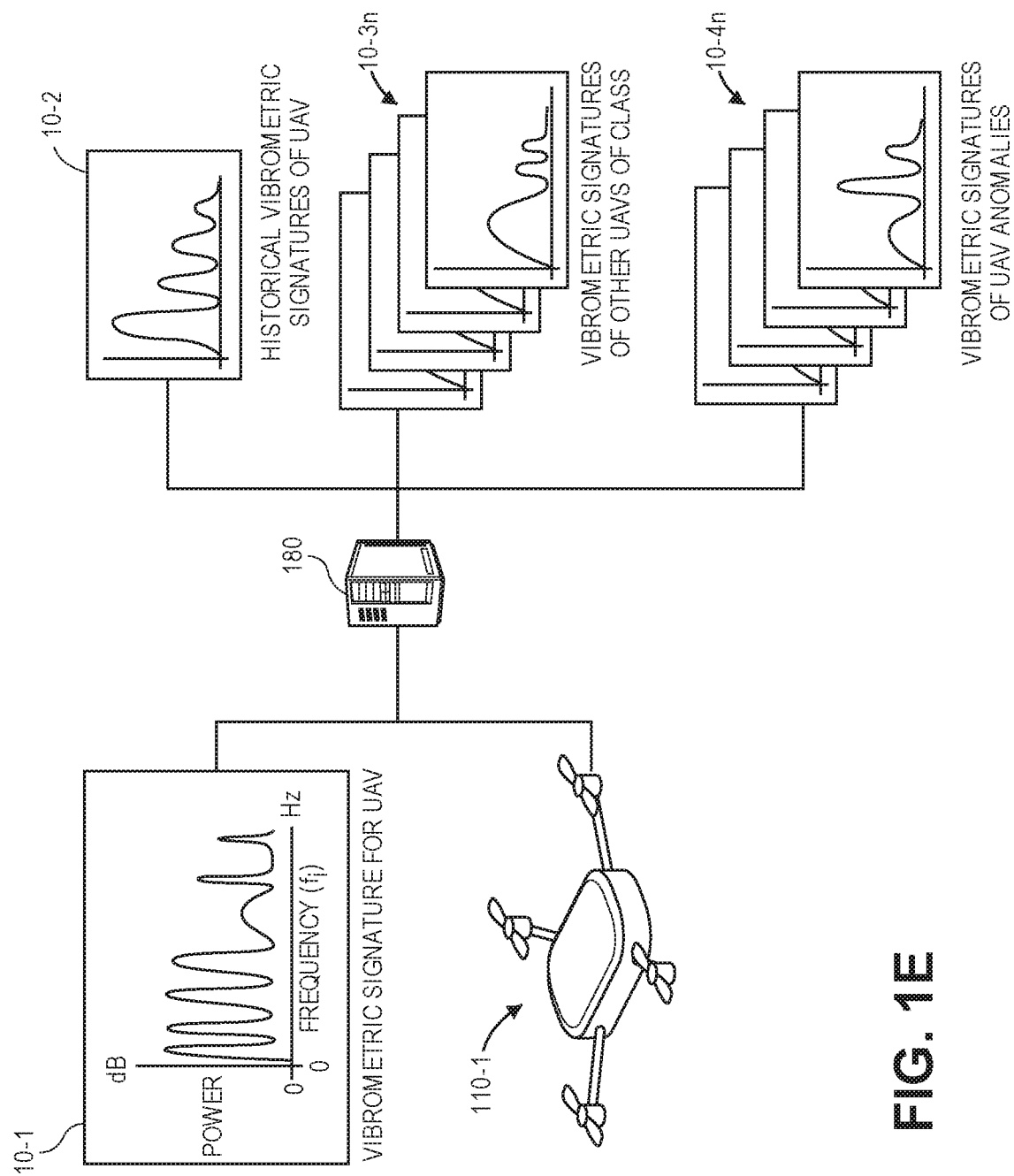

In accordance with the present disclosure, one or more determinations regarding the integrity of a vehicle, including but not limited to determinations regarding the adequacy of construction of the vehicle, or the suitability or fitness of the vehicle to perform one or more missions, can be made by comparing a vibrometric signature generated in response to excitation of the vehicle to one or more other vibrometric signatures. For example, as is shown in FIG. 1E, the vibrometric signature 10-1 generated for the aerial vehicle, as shown in FIG. 1D, may be compared to a vibrometric signature 10-2 previously generated for the aerial vehicle 110-1. If the vibrometric signature 10-1 is sufficiently similar to or consistent with the vibrometric signature 10-2, the aerial vehicle 110-1 may be determined to be in adequate operating condition, and may be cleared to perform one or more missions. If the vibrometric signature 10-1 is not sufficiently similar to or is inconsistent with the vibrometric signature 10-2, however, the aerial vehicle 110-1 may be subject to further evaluations or inspections to determine whether any changes that may hamper the performance of the aerial vehicle 110-1, or have otherwise impacted its integrity, have occurred since the vibrometric signature 10-2 was generated.

Likewise, the vibrometric signature 10-1 may be compared to one or more vibrometric signatures 10-3$n$ generated for a class of aerial vehicles that includes the aerial vehicle 110-1, in order to determine whether the aerial vehicle 110-1 was properly constructed according to a standard procedure or set of specifications for constructing aerial vehicles of the class, or whether further evaluations or inspections of the aerial vehicle 110-1 may be required. Also, the vibrometric signature 10-1 may be compared to one or more vibrometric signatures 10-4$n$ generated in response to the excitation of one or more other aerial vehicles that are known to have experienced one or more discrete anomalies. If the vibrometric signature 10-1 is similar to one or more of the vibrometric signatures 10-4$n$, the aerial vehicle 110 may be determined to have experienced a corresponding one of the discrete anomalies.

Vehicles, such as aerial vehicles, are typically evaluated from time to time to check for failures or deficiencies in materials and components. Because aerial vehicles commonly radiate noise and/or other vibrations in response to thrust or lift forces, flow conditions, impacts or other adverse events, aerial vehicles must be routinely tested to properly assess risks of failure of a specific component, of an aerial vehicle as a whole, or of aerial vehicles in a class or fleet. Whether conditions or deficiencies exist on an aerial vehicle may be assessed with respect to structural components, control surfaces, motors, propellers or appurtenances such as landing gear by performing one or more testing evolutions.

A vibrometric signature, or a set of natural frequencies of vibration, may be determined for an object, such as a vehicle, by subjecting the object to excitation across a range of frequencies, and capturing images of the object during the excitation. Positions of one or more pixels corresponding to aspects of the object may be tracked within the images. Power levels or energy levels associated with vibration at a variety of frequencies across the range may be determined. A natural frequency of vibration may be identified where the power level or energy level of vibration, or deviations in positions of the pixels, are sufficiently greater than at other frequencies during the excitation.

A vibrometric signature may be compared to other vibrometric signatures to make one or more determinations regarding integrity, suitability or fitness of the object. For example, a vibrometric signature generated for an object may be compared to a vibrometric signature previously generated for the object, in order to determine whether any changes in the integrity, suitability or fitness of the object have occurred. A vibrometric signature generated for the object may be compared to one or more vibrometric signatures generated for similar objects, e.g., for vehicles of a class, to determine whether the integrity, suitability or fitness of the object is substantially different from the integrity, suitability or fitness of the other objects, or whether the object has been constructed appropriately and in a manner consistent with the other objects. A vibrometric signature generated for the object may also be compared to one or more vibrometric signatures generated for one or more other objects, when such other objects are experiencing one or more anomalies.

An object, such as a vehicle or a component thereof, or any other object, may be subjected to natural excitation in any manner. For example, in some embodiments, acoustic energy generated by a speaker or another source of sound may be imparted upon the object across a range of frequencies, and at constant or varying intensities. Sound is kinetic energy released by vibration of molecules in a medium, such as air, and may be generated in any number of ways or in response to any number of events. For example, sound may be generated in response to vibrations resulting from impacts or frictional contact between two or more bodies, or in response to vibrations resulting from the rotation of one or more bodies such as shafts, e.g., by motors or other prime movers. Sound is also generated when motion or vibration of an object results in a pressure change in a medium, such as air, surrounding the object. For example, densities of the molecules of a medium within a vicinity of an object may be subjected to alternating periods of condensation and rarefaction, resulting in contractions and expansions of such molecules, and causing an issuance of a sound wave. Alternatively, a vehicle or a component thereof, or any other object, may be subject to excitation of any kind, in addition to or as an alternative to sound. For example, in some embodiments, a vehicle or another object may be subject to excitation by a component that is affixed to a surface of the vehicle or object, and configured to generate vibrations at any selected frequency within a known, defined range. In some embodiments, an excitation source may be an intrinsic component of a vehicle or another object, such as where a vehicle includes a motor that may be controlled to impart vibrations upon the vehicle at any selected frequency within a known, defined range. Moreover, frequencies of excitation may cover any range, such as from zero hertz to five hundred hertz (0 to 500 Hz), from zero hertz to two thousand hertz (0 to 2000 Hz), or over any other ranges, or any other range.

In some embodiments, energy may be emitted by a speaker or another excitation source in a stepwise fashion, e.g., according to a step function, or according to a delta function or any other function, such that a frequency of the energy being emitted remains constant for a brief period of time before being increased or decreased to another frequency. As energy is imparted upon an object at a given frequency, an imaging device may be aligned to capture images of the object at substantially high frame rates. For example, in some embodiments, the images may be captured at not less than twice a frequency of excitation, such as twice a maximum frequency of a range. In some embodiments, the images may be captured at not less than a Nyquist frequency.

Images captured by an imaging device during excitation of an object, such as a vehicle, may be processed to detect motion in the form of vibrations of one or more aspects of the object. For example, in some embodiments, images captured by the imaging device may be processed according to any optical flow method or technique to determine the motion of pixels corresponding to aspects of an object depicted within the images. A power level, or an energy level, associated with the motion of the pixels may be determined for each of the frequencies of a range. Where the power level or the motion observed at a given frequency of excitation exceeds a predetermined threshold, or is significantly greater than power levels or motion at other frequencies, the given frequency is a natural frequency of vibration. In some embodiments, a steerable filter may be used to determine the motion of such pixels. For example, in some embodiments, each image may be divided into an amplitude and a phase using a steerable filter bank or pyramid. Such filters may be used to estimate velocities in directions orthogonal to orientations of filter pairs. Differences in phases, weighted by their corresponding amplitudes, may provide an estimated power level or energy level of motion of a given aspect of an object, e.g., a vehicle, such as one or more pixels of the object. An overall (or global) estimated power level or energy level of the motion may be determined as a sum of local estimated power levels or energy levels for the object, as determined for a given frequency of excitation.

A vibrometric signature may take any number of forms in accordance with the present disclosure. For example, a vibrometric signature may comprise a set of the natural frequencies of vibration of an object or, alternatively, a plot or other representation of power levels or energy levels with respect to frequencies of excitation. In some embodiments, a raw vibrometric signature representing power levels or energy levels of vibration for each of a plurality of frequencies over a range may be generated based on discrete values of the natural frequencies at local or absolute maximum power levels or energy levels. Alternatively, in other embodiments, the vibrometric signature may include not only the discrete values of the natural frequencies and their corresponding local or absolute maximum power levels or energy levels but also values corresponding to slopes or derivatives of power levels or energy levels with respect to frequencies of the range, including but not limited to slopes or derivatives of power levels or energy levels around the natural frequencies. Furthermore, in some embodiments, a raw vibrometric signature may be smoothed, e.g., using a linear filter, across a sliding window of frequencies according to any number of weights.

Figure 2:
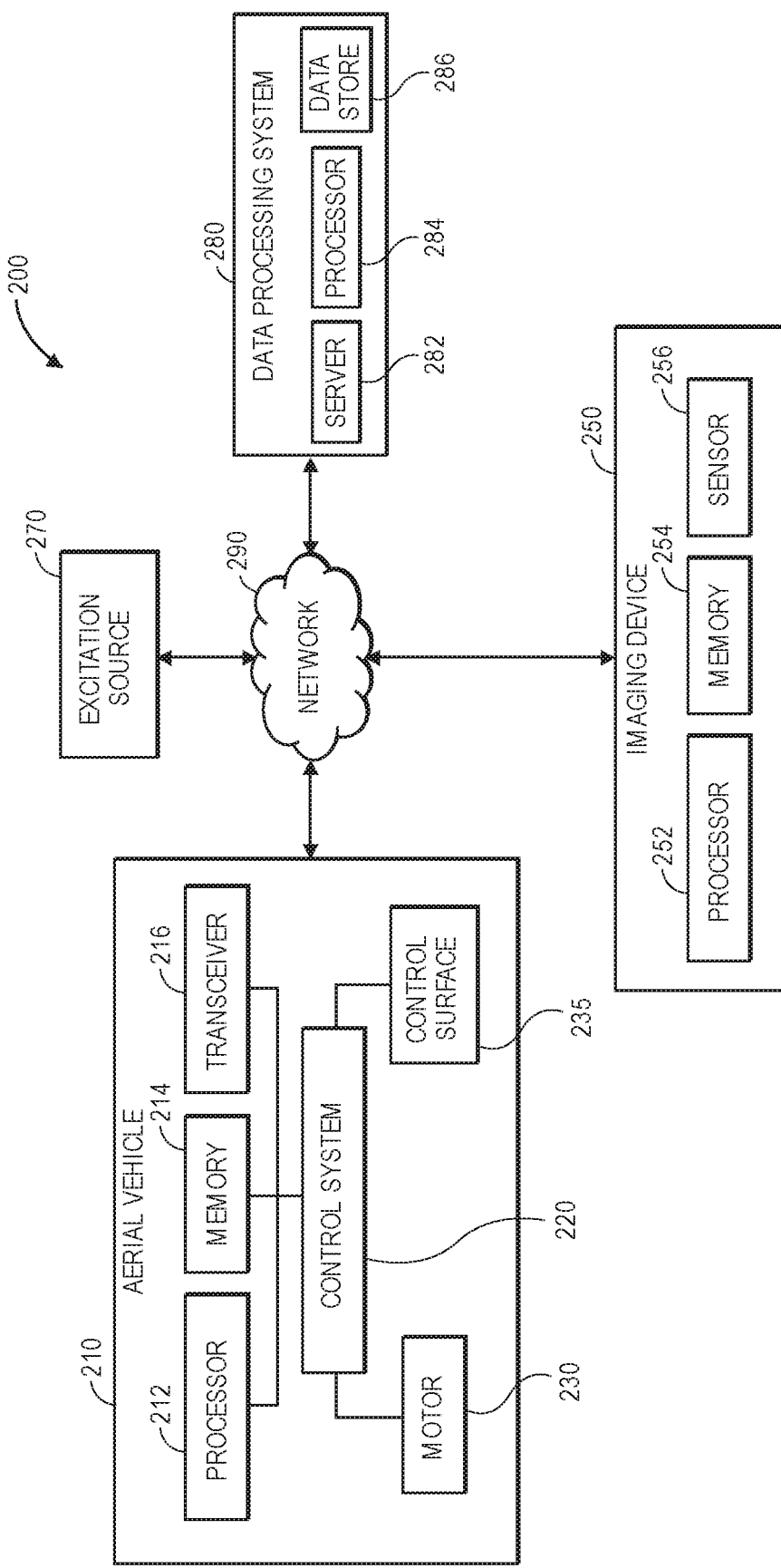
FIG. 2 is a block diagram of one system for determining vehicle integrity using vibrometric signatures in accordance with embodiments of the present disclosure.

Referring to FIG. 2, a block diagram of components of one system 200 for determining vehicle integrity using vibrometric signatures in accordance with embodiments of the present disclosure is shown. The system 200 of FIG. 2 includes an aerial vehicle 210, an imaging device 250, an excitation source 270 and a data processing system 280 connected to one another over a network 290. Except where otherwise noted, reference numerals preceded by the number "2" shown in the block diagram of FIG. 2 indicate components or features that are similar to components or features having reference numerals preceded by the number "1" shown in FIGS. 1A through 1E.

The aerial vehicle 210 includes a processor 212, a memory 214 and a transceiver 216. The aerial vehicle 210 further includes a control system 220, one or more propulsion motors 230, and one or more control surfaces 235.

The processor 212 may be configured to perform any type or form of computing function associated with the operation of the aerial vehicle 210, including but not limited to the execution of one or more machine learning tools, algorithms or techniques. The processor 212 may also be configured to execute any other algorithms or techniques (e.g., object detection or recognition algorithms or techniques) associated with one or more applications, purposes or functions, or to select at least one of a course, a speed or an altitude for the safe operation of the aerial vehicle 210. For example, the processor 212 may be configured to control any aspects of the operation of the aerial vehicle 210 and the one or more computer-based components thereon, including but not limited to the propulsion motors 230 or the control surfaces 235.

The processor 212 may also control the operation of one or more control systems or modules, such as the control system 220, for generating instructions for conducting operations of one or more of the propulsion motors 230 or one or more of the control surfaces 235, or for interpreting information or data captured by one or more onboard sensors (not shown). Such control systems or modules may be associated with one or more other computing devices or machines, and may communicate with the imaging device 250, the excitation source 270, the data processing system 280 or one or more other computer devices or aerial vehicles (not shown) over the network 290, through the sending and receiving of digital data.

The processor 212 may be a uniprocessor system including one processor, or a multiprocessor system including several processors (e.g., two, four, eight, or another suitable number), and may be capable of executing instructions. For example, in some embodiments, the processor 212 may be a general-purpose or embedded processor unit such as a CPU or a GPU having any number of instruction set architectures (ISAs), such as the x86, PowerPC, SPARC, or MIPS ISAs, or any other suitable ISA. Where the processor 212 is a multiprocessor system, each of the processors within the multiprocessor system may operate the same ISA, or different ISAs.

Additionally, the aerial vehicle 210 further includes one or more memory or storage components 214 (such as databases or data stores) for storing any type of information or data, e.g., instructions for operating the aerial vehicle 210, or information or data captured during operations of the aerial vehicle 210. The memory 214 may be configured to store executable instructions, imaging data, flight paths, flight control parameters and/or other data items accessible by or to the processor 212. The memory 214 may be implemented using any suitable memory technology, such as random-access memory (or "RAM"), static RAM (or "SRAM"), synchronous dynamic RAM (or "SDRAM"), nonvolatile/ Flash-type memory, or any other type of memory. In some embodiments, program instructions, imaging data, flight paths, flight control parameters and/or other data items may be received or sent via the transceiver 216, e.g., by transmission media or signals, such as electrical, electromagnetic, or digital signals, which may be conveyed via a communication medium such as a wired and/or a wireless link.

The transceiver 216 may be configured to enable the aerial vehicle 210 to communicate through one or more wired or wireless means, e.g., wired technologies such as Universal Serial Bus (or "USB") or fiber optic cable, or standard wireless protocols such as Bluetooth® or any Wireless Fidelity (or "Wi-Fi") protocol, such as over the network 290 or directly. The transceiver 216 may further include or be in communication with one or more input/ output (or "I/O") interfaces, network interfaces and/or input/ output devices, and may be configured to allow information or data to be exchanged between one or more of the components of the aerial vehicle 210, or to one or more other computer devices or systems (e.g., other aerial vehicles, not shown) via the network 290. For example, in some embodiments, the transceiver 216 may be configured to coordinate I/O traffic between the processor 212 and one or more onboard or external computer devices or components, e.g., the propulsion motors 230 or the control surfaces 235, or any other devices or components (not shown). The transceiver 216 may perform any necessary protocol, timing or other data transformations in order to convert data signals from a first format suitable for use by one component into a second format suitable for use by another component. In some embodiments, the transceiver 216 may include support for devices attached through various types of peripheral buses, e.g., variants of the Peripheral Component Interconnect (PCI) bus standard or the Universal Serial Bus (USB) standard. In some other embodiments, functions of the transceiver 216 may be split into two or more separate components, or integrated with the processor 212.

The control system 220 may include one or more electronic speed controls, power supplies, navigation systems and/or payload engagement controllers for controlling aspects of the operation of the aerial vehicle 210, as desired. For example, the control system 220 may be configured to cause or control the operation of one or more of the propulsion motors 230 or the control surfaces 235, or other components, such as to cause one or more of the propulsion motors 230 to rotate propellers at desired speeds, or to cause such propellers to be aligned in selected positions or orientations. The control system 220 may further control any other aspects of the aerial vehicle 210, including but not limited to the operation of one or more aspects of the control surfaces 235, which may include wings, rudders, ailerons, elevators, flaps, brakes, slats or other features within desired ranges, or the enactment with or release of one or more items by one or more engagement systems (not shown). In some embodiments, the control system 220 may be integrated with one or more of the processor 212, the memory 214 and/or the transceiver 216.

The propulsion motors 230 may be any type or form of motor (e.g., electric, gasoline-powered or any other type of motor) capable of generating sufficient rotational speeds of one or more propellers or other components to provide lift and/or thrust forces to the aerial vehicle 210 and any payload engaged thereby, to aerially transport the engaged payload thereby. In some embodiments, one or more of the propulsion motors 230 may be a brushless DC multi-phase motor such as an outrunner brushless motor or an inrunner brushless motor.

The aerial vehicle 210 may include any number of propulsion motors 230 of any kind. For example, one or more of the propulsion motors 230 may be aligned or configured to provide forces of lift to the aerial vehicle 210, exclusively, while one or more of the propulsion motors 230 may be aligned or configured to provide forces of thrust to the aerial vehicle 210, exclusively. Alternatively, one or more of the propulsion motors 230 may be aligned or configured to provide forces of lift and forces of thrust to the aerial vehicle 210, as needed. For example, the propulsion motors 230 may be fixed in their orientation on the aerial vehicle 210, or configured to vary their respective orientations, e.g., a tilt-rotor aircraft. Moreover, the propulsion motors 230 may be aligned or configured to operate with different capacities or ratings, or at different speeds, or coupled to propellers having different sizes and shapes. For example, in some embodiments, one or more of the propulsion motors 230 may be an electric motor, e.g., a brushless DC multi-phase motor, and one or more of the propulsion motors 230 may be a gasoline-powered motor.

Each of the propulsion motors 230 may be coupled to one or more propellers (or rotors or rotatable systems) having a plurality of shaped blades joined to a hub or boss. For example, each of such propellers may be rotatably mounted to a mast or shaft associated with a respective one of the propulsion motors 230 and may be configured to generate forces of thrust when rotated within a fluid. Each of such propellers may include any number of blades, and may be fixed pitch, adjustable pitch or variable pitch in nature. Moreover, one or more of such propellers may be banded or shielded in any manner. In some embodiments, one or more propellers may be configured to rotate about a vertical axis, and to provide forces of lift in a vertical direction (e.g., upward) accordingly. In some other embodiments, one or more of the propellers may be configured to rotate about a horizontal axis, and to provide forces of thrust in a horizontal direction (e.g., forward) accordingly. In still other embodiments, one or more of the propellers may be configured to rotate about axes that are neither horizontal nor vertical, and to provide forces of lift and/or thrust in directions corresponding to such axes accordingly.

The control surfaces 235 may be any sections or appurtenances provided on surfaces of the aerial vehicle 210 that may be manipulated in order to dynamically modify a position or orientation of the aerial vehicle 210 with respect to one or more degrees of freedom. For example, the control surfaces 235 may include, but are not limited to, wings, rudders, ailerons, elevators, flaps, brakes or slats, or other features. In some embodiments, each of the control surfaces 235 may include a motor, such as an electrical, mechanical and/or hydraulic or other component or actuator for rotating, translating or otherwise repositioning or reorienting a respective one of the control surfaces 235 during operation of the aerial vehicle 210, under the control of the one or more processors 212 or the control system 220. In some embodiments, each of the control surfaces 235 may include a directional sensor, such as any type of sensor or other component that is embedded into one or more aspects of one of the control surfaces 235 (e.g., a leading edge, a trailing edge, a tip or one or more other faces or aspects of such surfaces 235) and configured to gather information or data with respect to an alignment or orientation thereof. For example, one of the control surfaces 235 may include digital cameras or other imaging devices (e.g., depth sensors, range cameras, infrared cameras, radiographic cameras or other optical sensors) that are configured to capture imaging data such as still or moving images, associated audio content or other data or metadata, within a field of view or along a particular axis or direction.

Although the block diagram of FIG. 2 includes a single box for a propulsion motor 230 and a single box for a control surface 235, those of ordinary skill in the pertinent arts will recognize that any number or type of propulsion motors and/or control surfaces may be provided aboard the aerial vehicle 210 in accordance with the present disclosure.

The imaging device 250 may be any form of optical recording device that may be used to photograph or otherwise record imaging data of aerial vehicles, or for any other purpose, such as a digital camera, a range camera, a depth camera, an infrared camera, a radiographic camera, or the like. The imaging device 250 may include one or more processors 252, memory or storage components 254 and image sensors 256, as well as one or more photosensitive surfaces, filters, chips, electrodes, clocks, boards, timers or any other relevant features (not shown). The imaging device 250 may capture imaging data in the form of one or more still or moving images of any kind or form, as well as any relevant audio signals or other information, and may be connected to the aerial vehicle 210, the excitation source 270 and/or the data processing system 280 by way of the network 290.

Moreover, the imaging device 250 may also include manual or automatic features for modifying a respective position, field of view or orientation. For example, a digital camera may be configured in a fixed position, or with a fixed focal length (e.g., fixed-focus lenses) or angular orientation. Alternatively, the imaging device 250 may include one or more actuated or motorized features for adjusting a position of the imaging device 250, or for adjusting either the focal length (e.g., zooming the imaging device 250) or the angular orientation (e.g., the roll angle, the pitch angle or the yaw angle), by causing a change in the distance between the sensor and the lens (e.g., optical zoom lenses or digital zoom lenses), a change in the location of the imaging device 250, or a change in one or more of the angles defining the angular orientation.

For example, the imaging device 250 may be hard-mounted to a support or mounting that maintains the device in a fixed configuration or angle with respect to one, two or three axes. Alternatively, however, the imaging device 250 may be provided with one or more motors and/or controllers for manually or automatically operating one or more of the components, or for reorienting a position, axis or direction of the imaging device 250, i.e., by moving, panning or tilting the imaging device 250. Panning the imaging device 250 may cause a rotation within a horizontal plane or about a vertical axis (e.g., a yaw), while tilting the imaging device 250 may cause a rotation within a vertical plane or about a horizontal axis (e.g., a pitch). Additionally, the imaging device 250 may be rolled, or rotated about its axis of rotation, and within a plane that is perpendicular to the axis of rotation and substantially parallel to a field of view of the imaging device 250. The imaging device 250 may also be provided on a vehicle enabled to pass within an operating range of the aerial vehicle 210.

The imaging device 250 may also digitally or electronically adjust an image identified in a field of view, subject to one or more physical and operational constraints. For example, the imaging device 250 may virtually stretch or condense the pixels of an image in order to focus or broaden the field of view of the imaging device 250, and also translate one or more portions of images within the field of view. Imaging devices having optically adjustable focal lengths or axes of orientation are commonly referred to as pan-tilt-zoom (or "PTZ") imaging devices, while imaging devices having digitally or electronically adjustable zooming or translating features are commonly referred to as electronic PTZ (or "ePTZ") imaging devices.

The excitation source 270 may be any device or system configured to impart energy (e.g., sound energy) over a range of frequencies onto one or more objects, such as the aerial vehicle 210, within a field of view of the imaging device 250. For example, the excitation source 270 may be any type or form of speaker or like system having one or more transducers for converting electrical signals into sound energy such as electrodynamic speakers, electrostatic speakers, flat-diaphragm speakers, magnetostatic speakers, magnetostrictive speakers, ribbon-driven speakers, planar speakers, plasma arc speakers, or any other sound or vibration emitters. Alternatively, in some embodiments, the excitation source 270 may be any other system or component for imparting vibration energy onto one or more surfaces of an object, such as the propulsion motors 230, the control surfaces 235 or any other aspects of the aerial vehicle 210, e.g., by direct contact with the object or in any other manner. Moreover, in some embodiments, the excitation source 270 may be an intrinsic component of the aerial vehicle 210, such as one or more of the propulsion motors 230. The excitation source 270 may further include any number of processors or other components for communicating with one or more of the aerial vehicle 210, the imaging device 250 and/or the data processing system 280 over the network 290, as well as any number of power supplies of any type or form.

The data processing system 280 includes one or more physical computer servers 282 having one or more computer processors 284 and one or more data stores 286 associated therewith, and may be provided for any specific or general purpose. For example, the data processing system 280 of FIG. 2 may be independently provided for the exclusive purpose of receiving, analyzing or storing information or data received from the aerial vehicle 210, the imaging device 250 or the excitation source 270, including but not limited to frequencies, power levels, times and/or vibrometric signatures or other sets of data regarding natural frequencies of vibration. Alternatively, the data processing system 280 of FIG. 2 may be provided in connection with one or more physical or virtual services configured to receive, analyze or store such information or data, as well as one or more other functions.

In some embodiments, the data processing system 280 may be configured to program one or more excitation sources 270 to emit energy (e.g., acoustic energy, or sound) at any intensity and over a range of frequencies. For example, the data processing system 280 may program the one or more excitation sources 270 to emit energy over the range of frequencies in a linearly increasing manner, e.g., in a stepwise fashion, such that the frequency of the energy being emitted remains constant for a brief period of time before being increased or decreased to another frequency. In some embodiments, the data processing system 280 may be configured to program one or more imaging devices 250 to capture images of an object being subject to excitation at substantially high frame rates, e.g., at least twice a frequency of excitation, or at least a Nyquist frequency for the imaging devices 250. In some embodiments, the data processing system 280 may be configured to receive images from the one or more imaging devices 250 and process the images, e.g., according to one or more optical flow methods or techniques, or according to a steerable filter-based method, to detect low levels of vibration or other motion of such objects within the images, and to generate power levels or energy levels associated with the motion. In still other embodiments, the data processing system 280 may be configured to associate power levels or energy levels of vibration with frequencies of excitation, or to identify one or more natural frequencies of vibration based on local or absolute maximum levels of power or energy. The data processing system 280 may be further configured to generate one or more vibrometric signatures based on the power levels or energy levels and the corresponding frequencies of vibration, or to compare one vibrometric signature to one or more other vibrometric signatures on any basis.

The servers 282 may be connected to or otherwise communicate with the processors 284 and the data stores 286. The data stores 286 may store any type of information or data, including but not limited to information or data received from the aerial vehicle 210, the imaging device 250 or the excitation source 270, for any purpose. The servers 282 and/or the computer processors 284 may also connect to or otherwise communicate with the network 290, through the sending and receiving of digital data. For example, the data processing system 280 may include any facilities, stations or locations having the ability or capacity to receive and store information or data, such as media files, in one or more data stores, e.g., media files received from the aerial vehicle 210, or from one another, or from one or more other external computer systems (not shown) via the network 290. In some embodiments, the data processing system 280 may be provided in a physical location. In other such embodiments, the data processing system 280 may be provided in one or more alternate or virtual locations, e.g., in a "cloud"-based environment. In still other embodiments, the data processing system 280 may be provided onboard one or more aerial vehicles, including but not limited to the aerial vehicle 210.

The network 290 may be any wired network, wireless network, or combination thereof, and may comprise the Internet in whole or in part. In addition, the network 290 may be a personal area network, local area network, wide area network, cable network, satellite network, cellular telephone network, or combination thereof. The network 290 may also be a publicly accessible network of linked networks, possibly operated by various distinct parties, such as the Internet. In some embodiments, the network 290 may be a private or semi-private network, such as a corporate or university intranet. The network 290 may include one or more wireless networks, such as a Global System for Mobile Communications (GSM) network, a Code Division Multiple Access (CDMA) network, a Long Term Evolution (LTE) network, or some other type of wireless network. Protocols and components for communicating via the Internet or any of the other aforementioned types of communication networks are well known to those skilled in the art of computer communications and thus, need not be described in more detail herein.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

The aerial vehicle 210, the imaging device 250, the excitation source 270 or the data processing system 280 may use any web-enabled or Internet applications or features, or any other client-server applications or features including E-mail or other messaging techniques, to connect to the network 290, or to communicate with one another. For example, the aerial vehicle 210 and/or the imaging device 250 may be adapted to transmit information or data in the form of synchronous or asynchronous messages to the data processing system 280 or to any other computer device in real time or in near-real time, or in one or more offline processes, via the network 290. Those of ordinary skill in the pertinent art would recognize that the aerial vehicle 210, the imaging device 250, the excitation source 270 or the data processing system 280 may operate, include or be associated with any of a number of computing devices that are capable of communicating over the network 290. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a computer-readable medium that is within or accessible by computers or computer components such as the processor 212, the processor 252 or the processor 284, or any other computers or control systems utilized by the aerial vehicle 210, the imaging device 250, the excitation source 270 or the data processing system 280, and having sequences of instructions which, when executed by a processor (e.g., a central processing unit, or "CPU"), cause the processor to perform all or a portion of the functions, services and/or methods described herein. Such computer executable instructions, programs, software, and the like may be loaded into the memory of one or more computers using a drive mechanism associated with the computer readable medium, such as a floppy drive, CD-ROM drive, DVD-ROM drive, network interface, or the like, or via external connections.

Some embodiments of the systems and methods of the present disclosure may also be provided as a computer-executable program product including a non-transitory machine-readable storage medium having stored thereon instructions (in compressed or uncompressed form) that may be used to program a computer (or other electronic device) to perform processes or methods described herein. The machine-readable storage media of the present disclosure may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, embodiments may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

Figure 3:
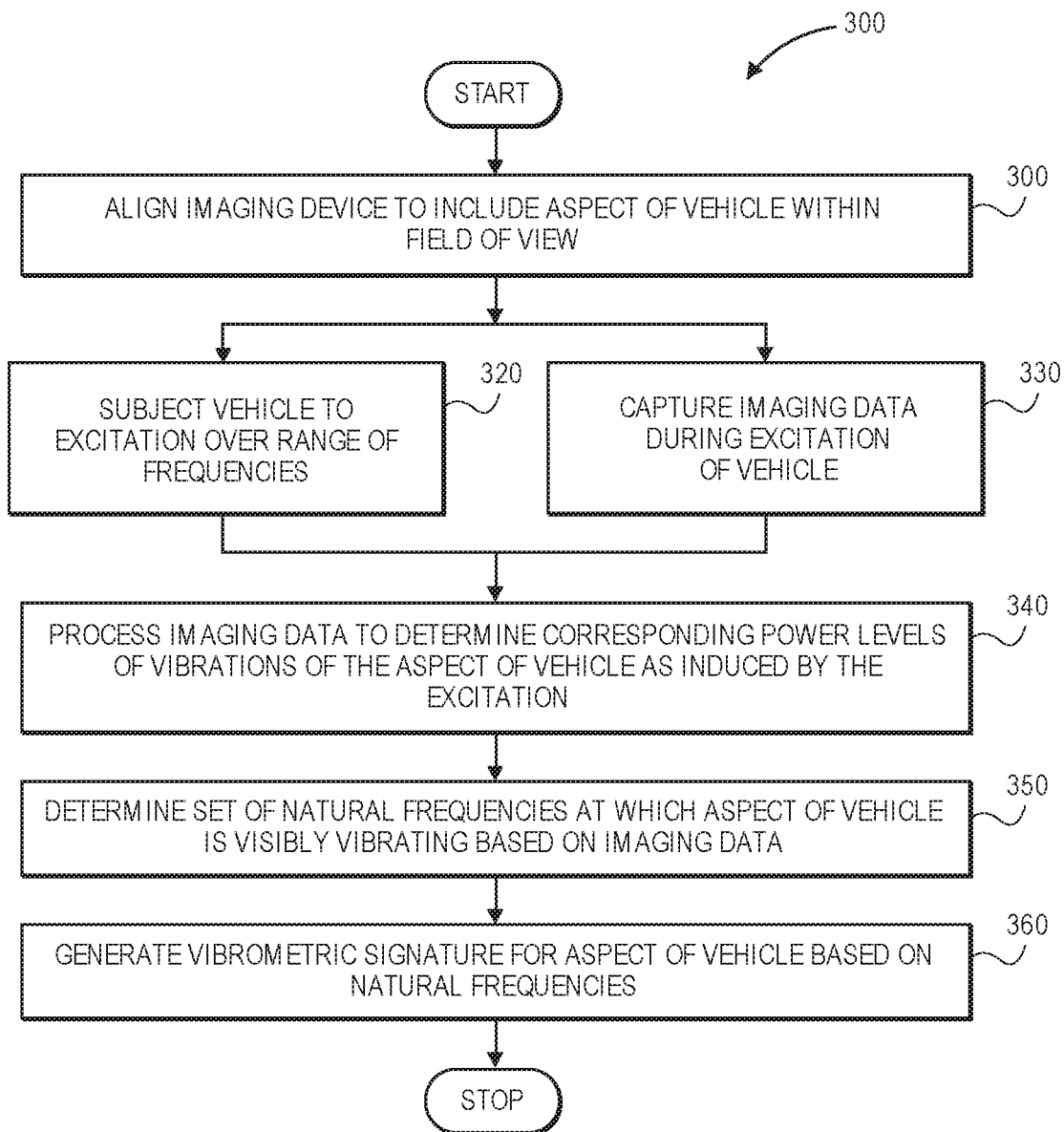
FIG. 3 is a flow chart of one process for determining vehicle integrity using vibrometric signatures in accordance with embodiments of the present disclosure.

As is discussed above, a vibrometric signature may be defined for an aircraft or other vehicle based on a set of natural frequencies of vibration, as determined by exciting the aircraft or the other vehicle with acoustic energy or any other type or form of energy over a range of frequencies, capturing imaging data of the vibrating vehicle, and processing the imaging data to identify the natural frequencies of vibration. Referring to FIG. 3, a flow chart 300 of one process for determining vehicle integrity using vibrometric signatures in accordance with embodiments of the present disclosure is shown. At box 310, an imaging device is aligned to include one or more aspects of a vehicle within a field of view. For example, in some embodiments, the imaging device may include the vehicle, in its entirety, within its field of view. In some other embodiments, however, the imaging device may include one or more portions of the vehicle having uniquely visible textures, patterns or surfaces, such as junctions between two or more components, or external markings having contrasting colors. Moreover, the vehicle may be any type or form of vehicle including but not limited to an aerial vehicle (e.g., an unmanned aerial vehicle, or drone), an autonomous ground vehicle or robot, an automobile, or any other powered or human-powered vehicle. Alternatively, in some embodiments, the imaging device may be aligned to include a portion of a vehicle, such as a specific propulsion motor, control surface or other component that may be attached or configured for attachment to any type or form of vehicle, within a field of view. In still other embodiments, an imaging device may be aligned to include one or more aspects of any type of object within a field of view, and the object need not be a vehicle or component thereof.

At box 320, the vehicle is subjected to excitation over a range of frequencies, e.g., by an excitation source. For example, the excitation source may be an acoustic speaker or other system configured to project acoustic energy at constant or varying intensities over a range of frequencies. In some embodiments, a frequency of the acoustic energy may be linearly increased over time over a defined range of frequencies, such as from zero hertz to five hundred hertz (0 to 500 Hz), from zero hertz to two thousand hertz (0 to 2000 Hz), or over any other ranges of frequencies, according to a step function or a delta function, or in any other manner. In some other embodiments, however, the excitation source may be any other component configured to excite the vehicle, such as by direct contact with the vehicle, e.g., a vibration source adhered or affixed to one or more surfaces of the vehicle, or an object that strikes the vehicle in one or more locations. For example, in some embodiments, the excitation source may be a machine such as a motor or other system that may be selectively programmed to generate vibrations or other motion over the range of frequencies. In parallel with the excitation, at box 330, imaging data is captured by the imaging device, e.g., during the excitation over the range of frequencies. For example, in some embodiments, the imaging device may be configured to capture images at a frame rate that is at least twice a frequency of the excitation, such as at least twice a maximum frequency of the range of frequencies. In some embodiments, the imaging device may be configured to capture images at a frame rate that is at least as great as a Nyquist frequency.

At box 340, the imaging data is processed to determine corresponding power levels of vibrations of at least the aspect of the vehicle, as induced by the excitation. In some embodiments, positions of one or more selected pixels of one or more aspects of the vehicle may be detected and tracked in successive frames to determine the extent to which such aspects vibrate in response to the excitation. For example, in some embodiments, an optical flow method or technique may be utilized to detect and track small movements of aspects of the vehicle within the imaging data. In some embodiments, a steerable filter method by which small motions across or between image frames are estimated using a bank of filters, or a steerable pyramid, to break down each of the image frames into an amplitude and a phase at different scales and orientations. Pairs of such filters may be used to estimate a velocity in directions orthogonal to the orientations of the respective filter pairs, and phases of the velocities are used to estimate extents of local vibrations or small motions. Where such phases are subtracted from phases computed for a reference frame, differentials of such phases may be summed and weighted by squares of their amplitudes in order to estimate a power level (e.g., measured in decibels) of the local vibration, and to determine a two-dimensional distribution of vibrations across the visible aspects of the vehicle for a given frequency of excitation. Any other method or technique for estimating a power level of vibrations at a given frequency may be utilized in accordance with the present disclosure.

In some embodiments, the imaging data may be processed as the vehicle is subjected to the excitation over the range of frequencies, such that the power levels associated with a given frequency of excitation are determined in real time or in near-real time, in order to identify a set of natural frequencies of vibration. In some other embodiments, such as where the imaging data is time-stamped or otherwise marked or designated to correspond with given frequencies, the imaging data may be processed at a later time, e.g., after the vehicle has been subjected to the excitation, in order to identify a set of natural frequencies of vibration.

At box 350, a set of natural frequencies at which the one or more aspects of the vehicle visibly vibrate are determined based on the imaging data. For example, the set of natural frequencies may be identified for the one or more modes of vibration as corresponding to peak levels of power or energy in response to the excitation. At box 360, a vibrometric signature is generated for at least the aspects of the vehicle based on the natural frequencies, and the process ends. For example, the vibrometric signature may be a set of data identifying the natural frequencies at which peak power levels were observed, or a plot or wave corresponding to power levels associated with frequencies over the range. The vibrometric signature may be stored in one or more data stores, or used to make one or more determinations regarding the integrity, suitability or fitness of the vehicle for performing one or more missions.

Figure 4A:
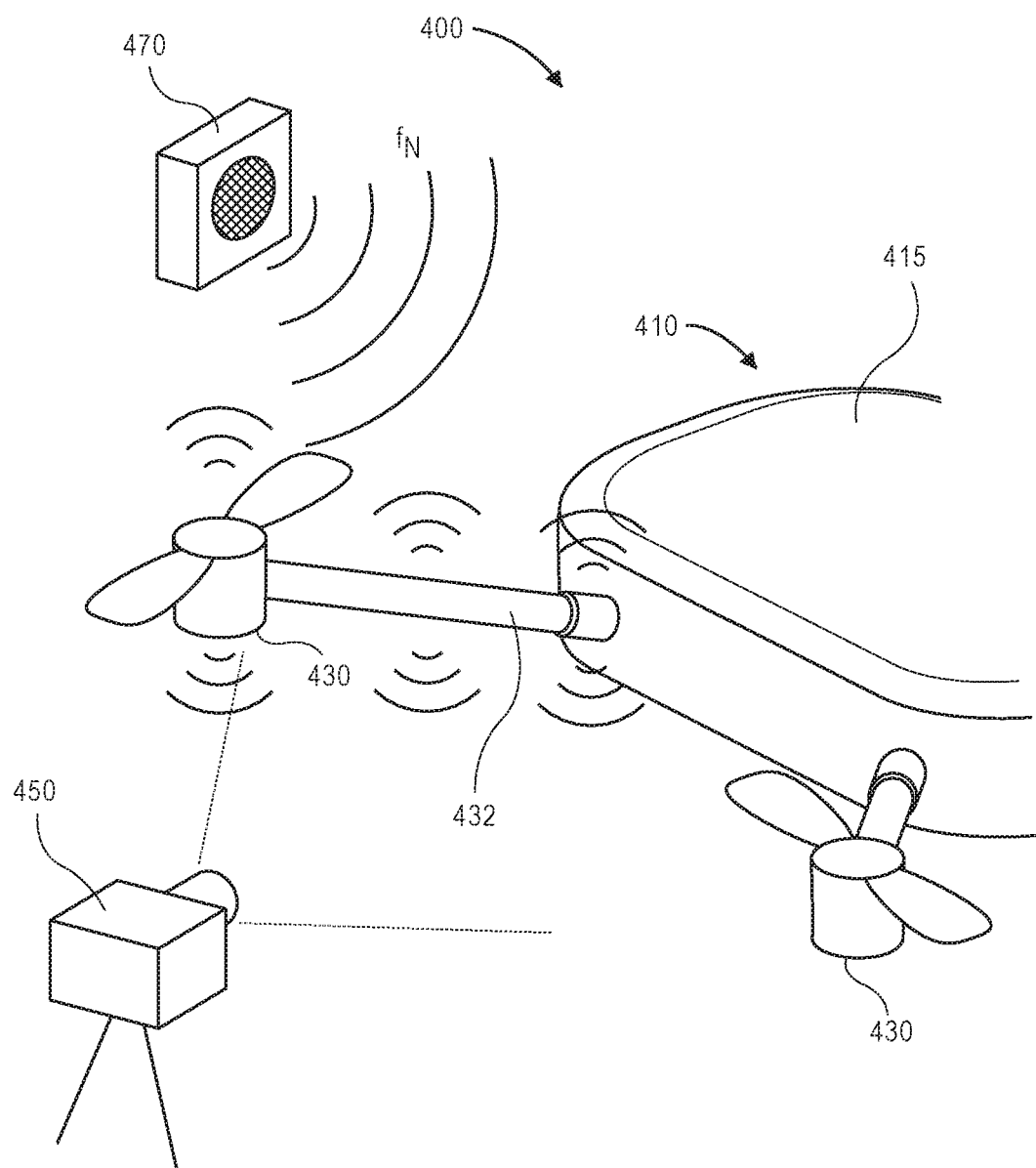
FIGS. 4A through 4C are views of aspects of one system for determining vehicle integrity using vibrometric signatures in accordance with embodiments of the present disclosure.
Figure 4B:
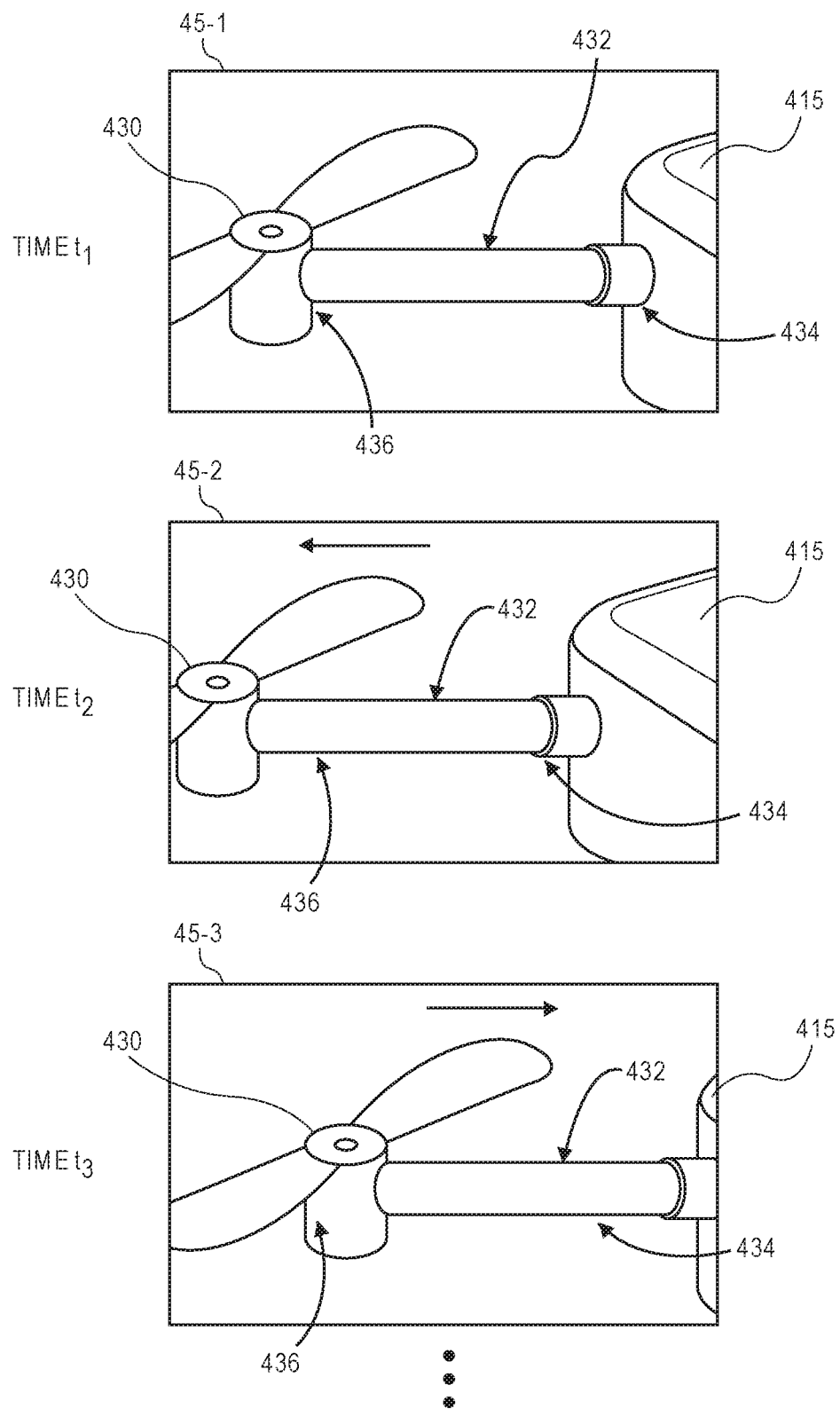
Figure 4C:
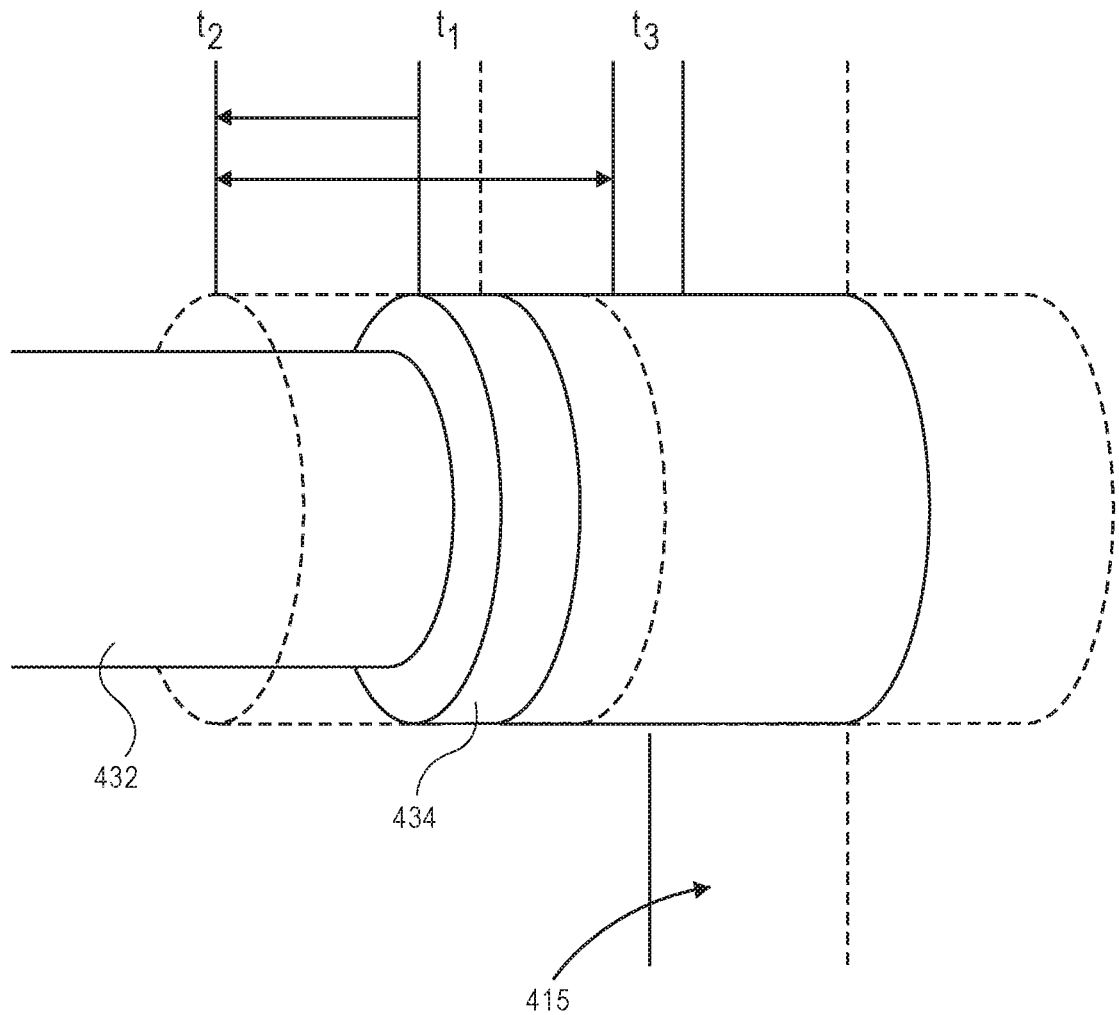

Referring to FIGS. 4A through 4C, views of aspects of one system 400 for determining vehicle integrity using vibrometric signatures in accordance with embodiments of the present disclosure are shown. Except where otherwise noted, reference numerals preceded by the number "4" shown in FIGS. 4A through 4C indicate components or features that are similar to components or features having reference numerals preceded by the number "2" shown in FIG. 2 or by the number "1" shown in FIGS. 1A through 1E.

As is shown in FIG. 4A, the system 400 includes an aerial vehicle 410, an imaging device 450 and an acoustic speaker 470. The aerial vehicle 410 includes a frame 415 having a plurality of motors 430 and a plurality of extensions 432. Each of the extensions 432 has a proximal end coupled to the frame 415 at a junction 434 and a distal end coupled to one of the motors 430. The imaging device 450 is aligned to include one of the extensions 432, one of the motors 430 and one of the junctions 434 within a field of view. The acoustic speaker 470 is also aligned to project acoustic energy in the form of sounds at one or more frequencies $f_N$ of a range, at any level of intensity, upon one or more portions of the aerial vehicle 410. Alternatively, the acoustic speaker 470 may be replaced or supplemented with any other type or form of excitation source that may excite the aerial vehicle 410 at known, selected frequencies with the aerial vehicle 410 within a field of view of the imaging device 450.

As is shown in FIG. 4B, the imaging device 450 captures images during the excitation of the aerial vehicle 410 by the acoustic speaker 470. For example, at a time $t_1$, the imaging device 450 captures an image 45-1 depicting portions of the aerial vehicle 410 at that time. At a time $t_2$, the imaging device 450 captures another image 45-2 depicting the portions of the aerial vehicle 410 at that time. At a time $t_3$, the imaging device 430 captures yet another image 45-3 depicting the portions of the aerial vehicle 410 at that time. The images 45-1, 45-2, 45-3 are captured at a frame rate that is preferably at least twice one or more of the frequencies $f_N$ of the range, or in excess of a Nyquist rate for the imaging device 450.

As is shown in FIG. 4C, the positions of one or more aspects of the aerial vehicle 410 may be tracked to detect the vibration of such aspects in response to the acoustic excitation at one of the frequencies $f_N$, and to calculate a power level associated with such vibration. In some embodiments, the imaging device 450 may be specifically configured to capture images of one or more of the extensions 432, the motors 430 and/or the junctions 434, and positions of pixels having unique textures, patterns or positions, such as the junction 434, may be tracked accordingly in the images captured thereby. For example, a power level associated with the vibration of the junction 434 may be determined, as is shown in FIG. 4C, based on deviations in the position of the junction 434 at the times $t_1$, $t_2$, $t_3$, as detected within the images 45-1, 45-2, 45-3, when the junction 434 is subjected to the acoustic excitation at one of the frequencies $f_N$. Where such power levels or deviations at a given one of the frequencies $f_N$ exceed a predetermined threshold, or are significantly greater than power levels or deviations at other frequencies, the one of the frequencies $f_N$ may be determined to be a natural frequency of vibration. In accordance with embodiments of the present disclosure, a vibrometric signature may be generated based on a set of natural frequencies of vibration for a given object, such as the aerial vehicle 410.

Figure 5A:
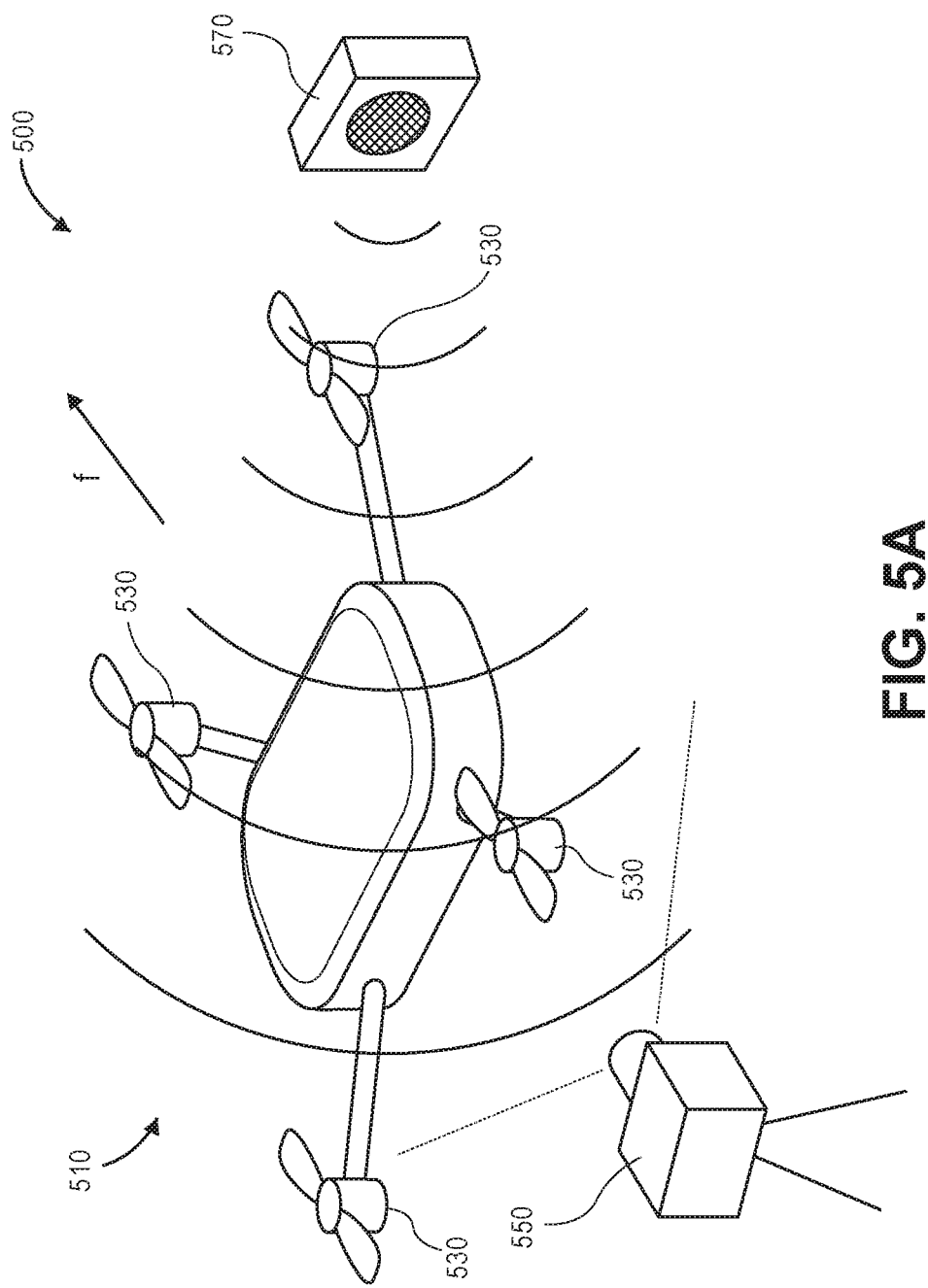
Figure 5B:
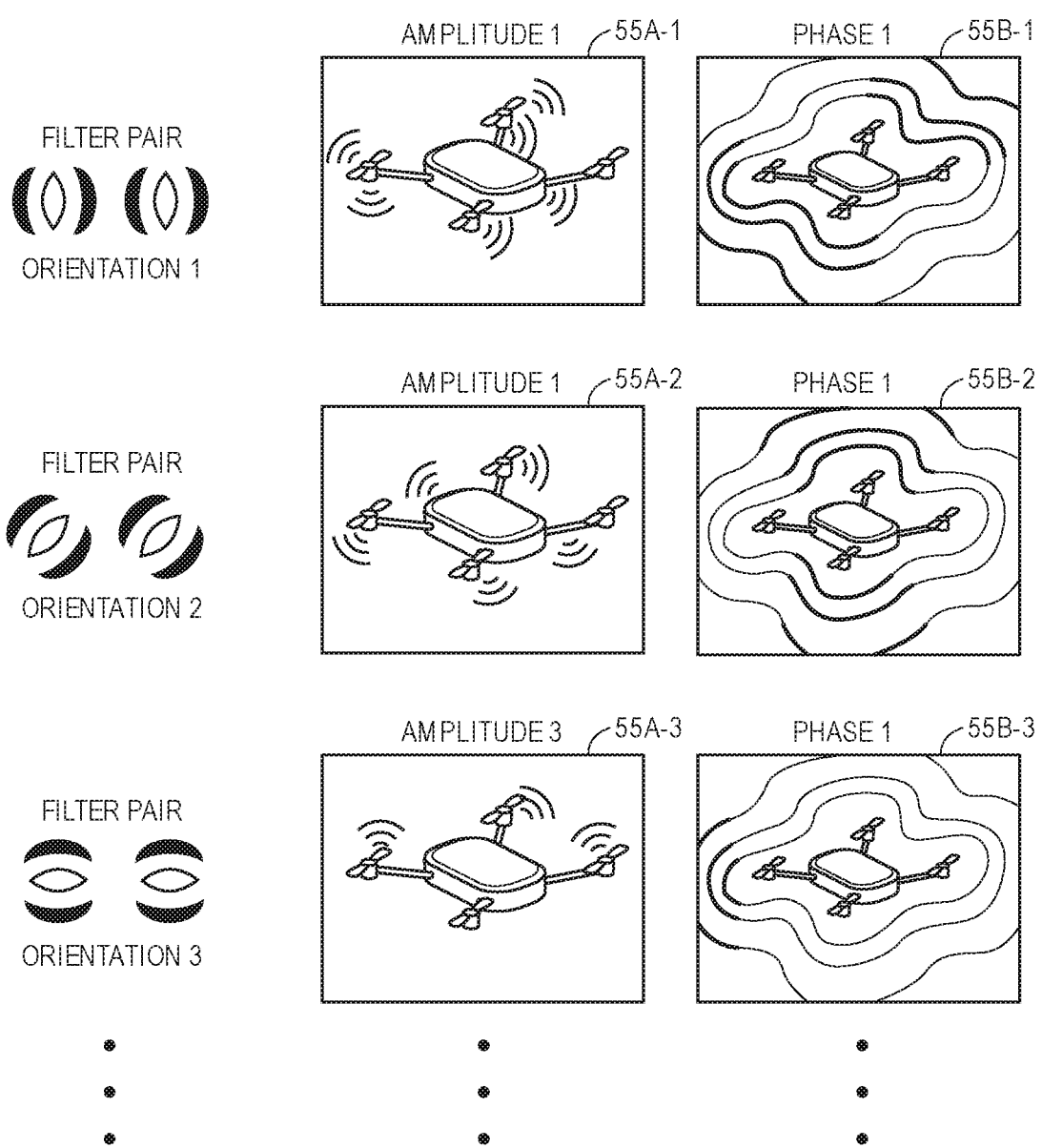

Referring to FIGS. 5A through 5C, views of aspects of one system 500 for determining vehicle integrity using vibrometric signatures in accordance with embodiments of the present disclosure are shown. Except where otherwise noted, reference numerals preceded by the number "5" shown in FIGS. 5A through 5C indicate components or features that are similar to components or features having reference numerals preceded by the number "4" shown in FIGS. 4A through 4C, by the number "2" shown in FIG. 2 or by the number "1" shown in FIGS. 1A through 1E.

As is shown in FIG. 5A, the system 500 includes an aerial vehicle 510, an imaging device 550 and an acoustic speaker 570. The aerial vehicle 510 includes a plurality of motors 530. The imaging device 550 is aligned to include one or more portions of the aerial vehicle 510 within a field of view. The acoustic speaker 570 is also aligned to project acoustic energy in the form of sounds at one or more frequencies f, at any level of intensity, upon one or more portions of the aerial vehicle 510. Alternatively, an excitation source configured to excite the aerial vehicle 510 at known, selected frequencies of a range with the aerial vehicle 510 within a field of view of the imaging device 550, other than an acoustic speaker, may be utilized.

As is discussed above, vibration or other motion of the aerial vehicle 510 may be detected from images captured by the imaging device 550 during the excitation of the aerial vehicle 510 in any manner. For example, in some embodiments, an optical flow method or technique may track deviations in position of one or more pixels from image to image, and a power level or energy level associated with the vibration or motion for a given frequency may be calculated based on such deviations.

In some other embodiments, one or more steerable filters may be used to determine power levels or energy levels of local motion or vibration. A steerable filter-based method may use a plurality of filters (e.g., quadrature pairs of Gabor filters, or Gabor-like filters) that are aligned in selected orientations in order to estimate a velocity of pixels within images in directions that are orthogonal to the orientations of the filters. As is shown in FIG. 5B, the steerable filters may break each of the images captured using the imaging device 550 into an amplitude and a phase at a variety of scales and orientations. For example, as is shown in FIG. 5B, representations of amplitudes 55A-1 of vibrations of pixels and phases 55B-1 of the vibrations depicted in an image may be determined with a pair of filters coaligned in a first orientation. Likewise, as is also shown in FIG. 5B, representations of amplitudes 55A-2, 55A-3 of the vibration and phases 55B-2, 55B-3 of the vibration depicted in the image may be determined with the pair of filters coaligned in second and third orientations, and so on.

In some embodiments, phases of velocities of sets of pixels may be subtracted from phases computed for a reference image, e.g., a first image captured by the imaging device 550, or an image captured at periodic intervals during the excitation. Differences between the phases, weighted by squares of their respective amplitudes, may be summed over one or more of the images to estimate a power level or an energy level of vibration of given sets of pixels at a given frequency of excitation. Such processes may be repeated to determine a two-dimensional distribution of vibrations or other motion across a visible area of an object within a field of view of the imaging device 550, and a global or overall estimate of a power level or an energy level associated with the vibrations or other motion may be computed for a given frequency.

Where a frequency of excitation is changed over time, e.g., by increasing the frequency across a given range, power levels or energy levels corresponding to induced vibrations observed at a given frequency may be calculated. As is shown in FIG. 5C, a vibrometric signature 50 may be generated for the aerial vehicle 510, or for one or more components thereof, based on the power levels or energy levels at frequencies across the range. In particular, and as is shown in FIG. 5C, the vibrometric signature 50 indicates power levels or energy levels at discrete values of natural frequencies $(f_N)_1, (f_N)_2, (f_N)_3, (f_N)_4, (f_N)_5, (f_N)_6$ of excitation, which are observed with local or absolute maximum levels of power or energy. Alternatively, in other embodiments, the vibrometric signature may include not only the discrete values of the natural frequencies $(f_N)_1, (f_N)_2, (f_N)_3, (f_N)_4, (f_N)_5, (f_N)_6$ and their corresponding local or absolute maximum power levels or energy levels but also values corresponding to slopes or derivatives of power levels or energy levels with respect to frequencies of the range, including but not limited to slopes or derivatives of power levels or energy levels around the natural frequencies. Furthermore, in some embodiments, the vibrometric signature 50 may be further smoothed, such as by using a linear filter across a sliding window of frequencies according to any number of weights, or in any other manner.

When a vehicle (or another object) is constructed according to a standard procedure or set of specifications, e.g., where the vehicle is one of a class of vehicles, a vibrometric signature determined for the vehicle upon completing construction may be compared to one or more vibrometric signatures that are anticipated or ordinarily encountered by other vehicles that are constructed according to the standard procedure or set of specifications, e.g., other vehicles of the class. Where the vibrometric signature for the newly constructed vehicle is consistent with such other vibrometric signatures, the vehicle may be determined to have been properly constructed. Where the vibrometric signature for the newly constructed vehicle substantially deviates from such other vibrometric signatures, however, further inspection or evaluation of the newly constructed vehicle may be required prior to placing the newly constructed vehicle into service.

Figure 6:
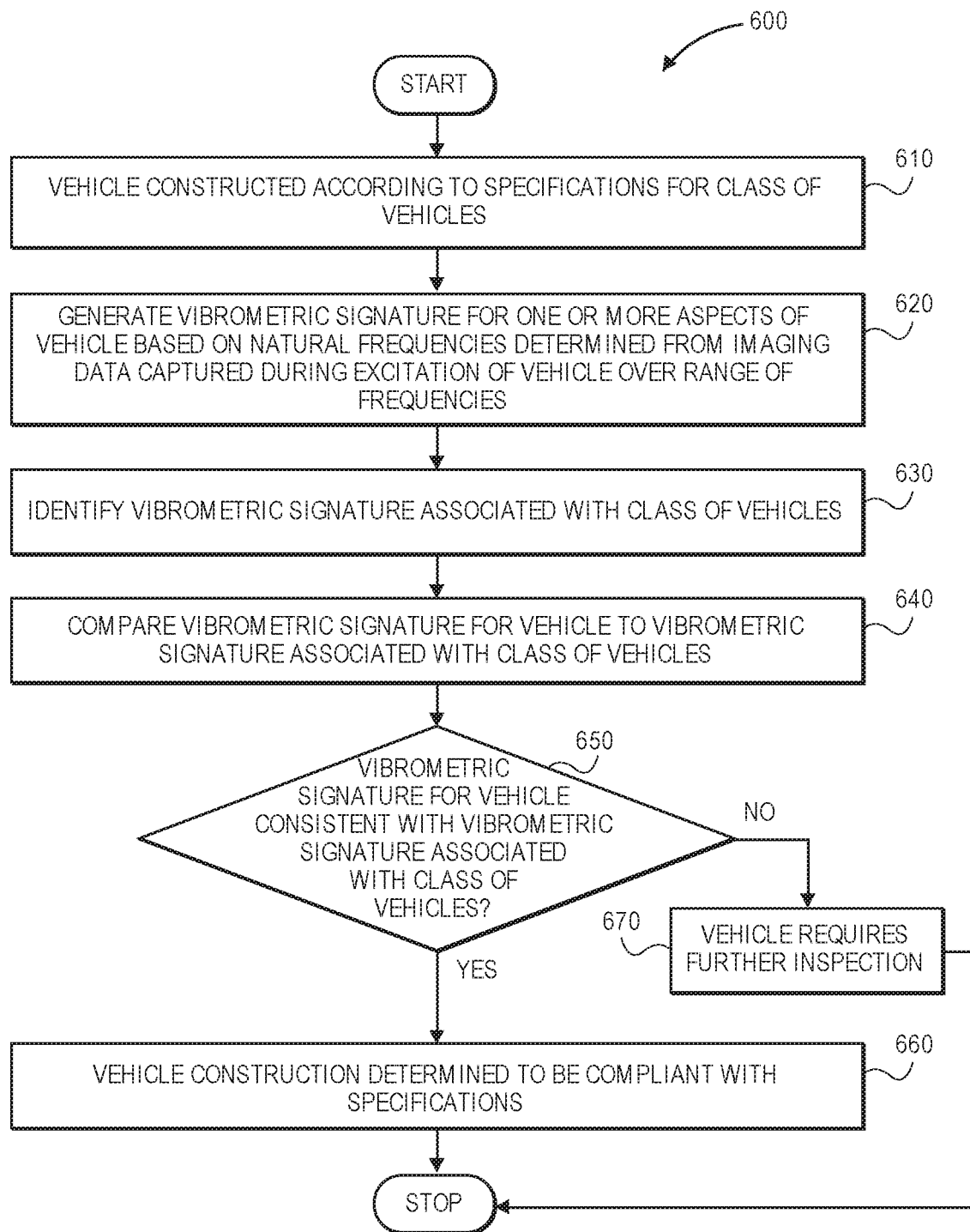
FIG. 6 is a flow chart of one process for determining vehicle integrity using vibrometric signatures in accordance with embodiments of the present disclosure.

Referring to FIG. 6, a flow chart 600 of one process for determining vehicle integrity using vibrometric signatures in accordance with embodiments of the present disclosure is shown. At box 610, a vehicle is constructed according to specifications for a class of vehicle. For example, the vehicle may be built according to procedures or using materials associated with the class of vehicles, e.g., using one or more manuals or other sets of procedures defined for the class of vehicles.

At box 620, a vibrometric signature is generated for one or more aspects of the vehicle based on natural frequencies determined from imaging data captured during the excitation of the vehicle over a range of frequencies by an excitation source. For example, an imaging device may be aligned to include one or more surfaces of the newly constructed vehicle that have unique or readily discernible textures, patterns or features within a field of view of the imaging device, and an acoustic source (e.g., a speaker) may be configured to project acoustic energy onto the vehicle at any intensity and over a defined range of frequencies, such as from zero hertz to five hundred hertz (0 to 500 Hz), from zero hertz to two thousand hertz (0 to 2000 Hz), or over any other ranges of frequencies. Alternatively, any other type or form of excitation source that is configured to excite the vehicle at known, selected frequencies may be utilized. Moreover, the imaging data may include images that are captured during the excitation at a rate that is at least twice the frequencies at which the vehicle is excited (e.g., at least twice a maximum frequency of the range), or above a Nyquist rate.

The imaging may be processed in any manner in order to detect vibrations of the aspects of the vehicle depicted therein, such as according to one or more optical flow methods or techniques, and to determine energies associated with such vibrations. Where the energies of the vibrations associated with a discrete excitation frequency exceed a predetermined threshold, or are sufficiently greater than energies of vibrations associated with other excitation frequencies, the discrete excitation frequency may be determined to be a natural frequency of vibration for the vehicle, or for the aspects of the vehicle depicted within the images.

A vibrometric signature may be generated based on power levels (or energy levels) calculated with respect to frequencies for the excitation of the vehicle. In some embodiments, the vibrometric signature may be generated based on the values of natural vibration frequencies, e.g., frequencies having local or absolute maximum power levels over the range of frequencies. In some embodiments, the vibrometric signature may be generated based on both the values of natural vibration frequencies and the values of power levels over the range of frequencies. For example, in some embodiments, the vibrometric signature may be defined based on a plot of the power levels versus the range of frequencies. Alternatively, the vibrometric signature may be generated in any other manner.

At box 630, a vibrometric signature is identified as being associated with the class of vehicles. In some embodiments, the vibrometric signature may be defined based on average, minimum, maximum or median natural frequencies of vibration, as determined for one or more vehicles of the class, e.g., in response to exciting the one or more vehicles with energy and capturing images of the one or more vehicles during such excitation. For example, in some embodiments, the vibrometric signature for the class of vehicles may be defined based on natural frequencies as determined for a lead vehicle of the class, e.g., a first vehicle constructed according to specifications for the class of vehicle, such as at box 610. In some other embodiments, the vibrometric signature may be defined for the class of vehicles in any other manner.

At box 640, the vibrometric signature generated for the vehicle at box 620 is compared to the vibrometric signature identified as being associated with the class of vehicles at box 630. At box 650, whether the vibrometric signature for the vehicle is consistent with the vibrometric signature associated with the class of vehicles is determined. For example, whether the natural frequencies of the vibrometric signature generated for the vehicle at box 620 are equal or approximate to the natural frequencies of the vibrometric signature identified as being associated with the class of vehicles at box 630 may be determined. Alternatively, a shape of a plot of power levels (or energy levels) versus frequencies of excitation of the vibrometric signature generated for the vehicle at box 620 may be compared to a shape of a plot of power levels (or energy levels) versus frequencies of excitation of the vibrometric signature identified as being associated with the class of vehicles at box 630. The vibrometric signature generated for the vehicle and the vibrometric signature associated with the class of vehicles may be compared to one another in any other manner in accordance with embodiments of the present disclosure.

If the vibrometric signature generated for the vehicle at box 620 is consistent with the vibrometric signature identified as being associated with the class of vehicles at box 630, then the process advances to box 660, where the vehicle construction is determined to be compliant with the specifications, and the process ends. Accordingly, one or more indications of the condition of the vehicle (e.g., integrity, suitability or fitness for performing one or more missions) may be generated and/or stored in one or more data stores. If the vibrometric signature generated for the vehicle at box 620 is determined to be inconsistent with the vibrometric signature identified as being associated with the class of vehicles at box 630, however, then the process advances to box 670, where the vehicle is determined to require further inspections. In such instances, the vehicle may be blocked from participating in further missions or subject to any other evaluation or inspection.

Figure 7A:
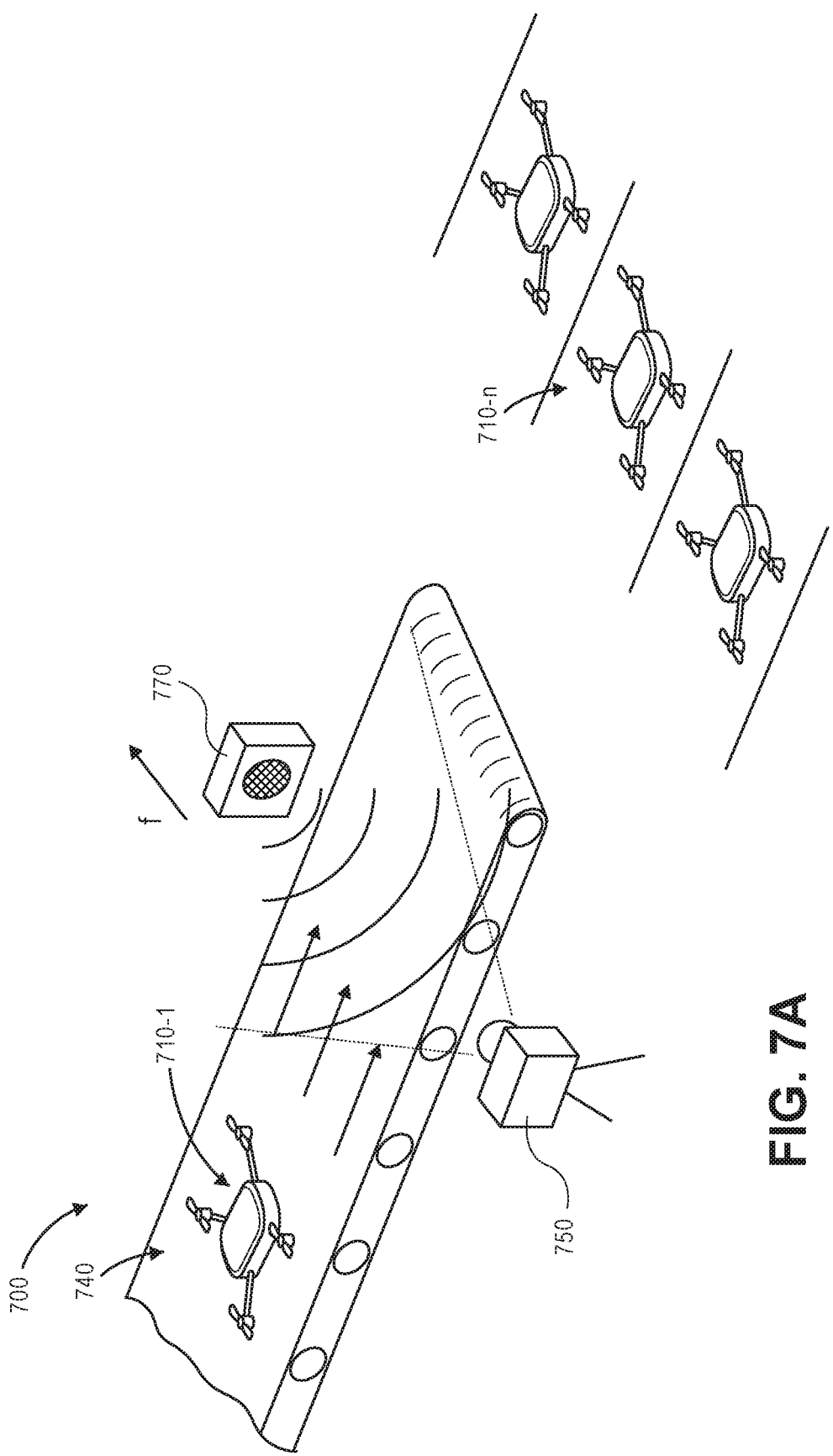
FIGS. 7A through 7C are views of aspects of one system for determining vehicle integrity using vibrometric signatures in accordance with embodiments of the present disclosure.
Figure 7B:
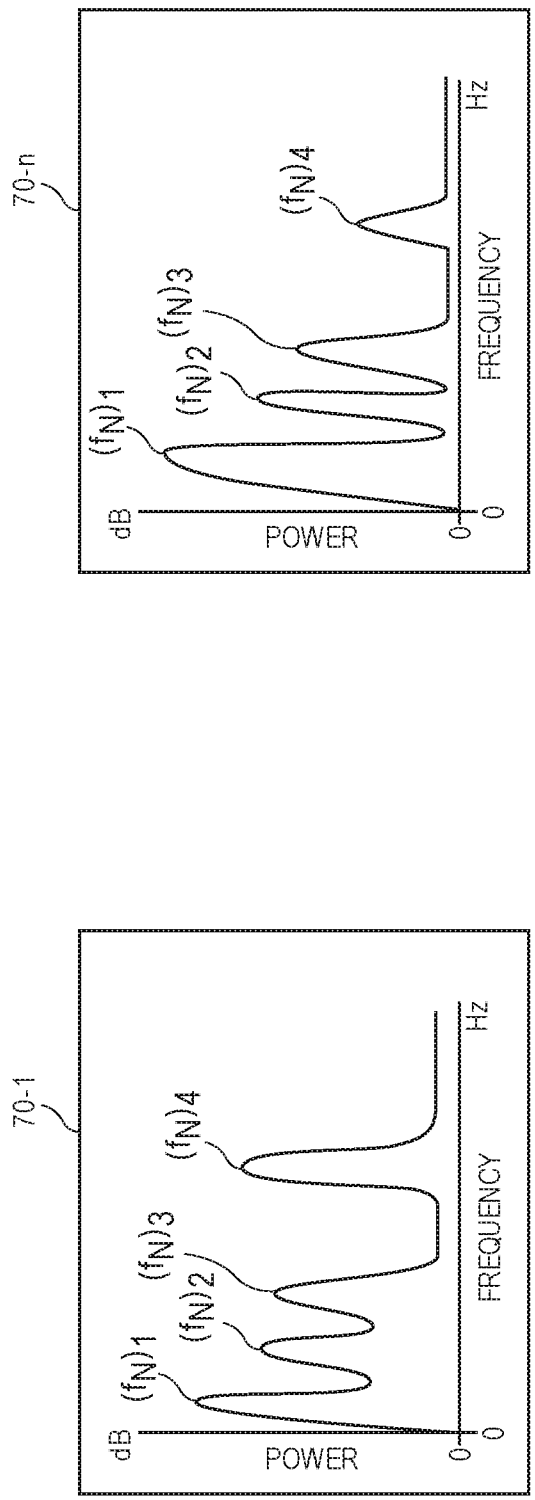
Figure 7B:
Figure 7C:
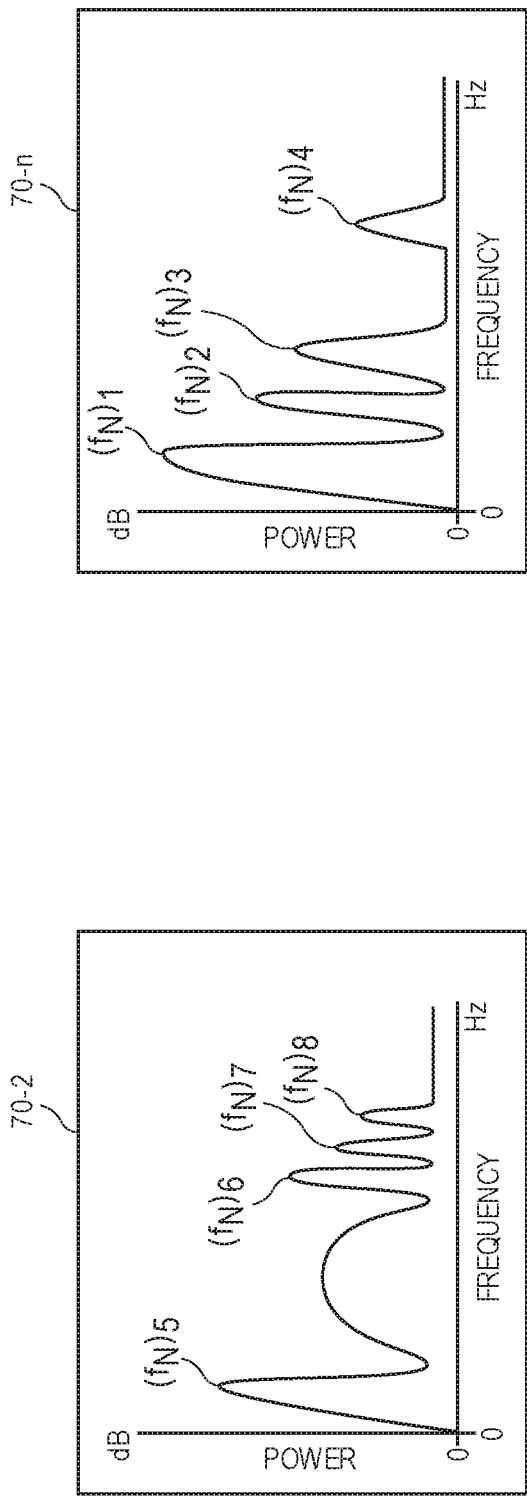
Figure 7C:
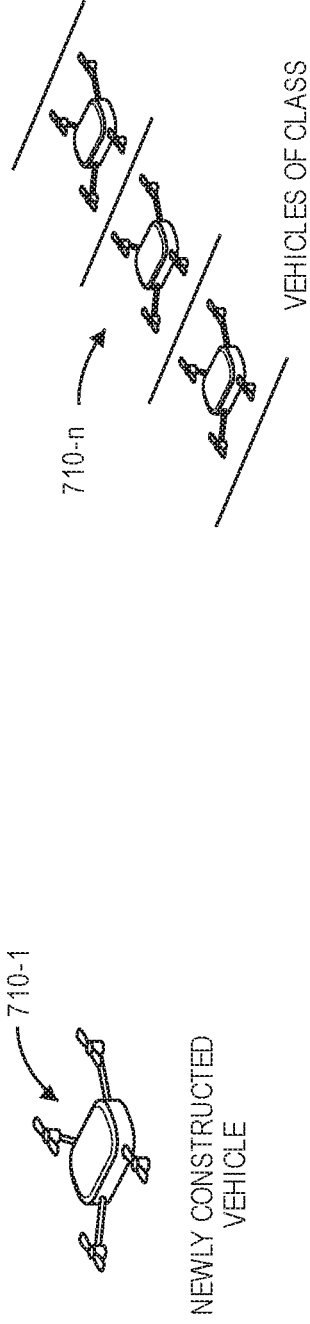

Whether a vibrometric signature of a vehicle of a class is consistent with one or more vibrometric signatures associated with the class may be determined at any time, including when the vehicle is initially constructed, after periods of extended operation, or at any other time. Referring to FIGS. 7A through 7C, views of aspects of one system 700 for determining vehicle integrity using vibrometric signatures in accordance with embodiments of the present disclosure are shown. Except where otherwise noted, reference numerals preceded by the number "7" shown in FIGS. 7A through 7C indicate components or features that are similar to components or features having reference numerals preceded by the number "5" shown in FIGS. 5A through 5C, by the number "4" shown in FIGS. 4A through 4C, by the number "2" shown in FIG. 2 or by the number "1" shown in FIGS. 1A through 1E.

As is shown in FIG. 7A, the system 700 includes an aerial vehicle 710-1, a conveyor 740, an imaging device 750 and an acoustic speaker 770, along with a plurality of aerial vehicles 710-$n$. The aerial vehicle 710-1 may be one of a class of aerial vehicles that includes the aerial vehicles 710-$n$. The aerial vehicle 710-1 travels on the conveyor 740, which extends between the imaging device 750 and the acoustic speaker 770. The imaging device 750 is aligned to capture images of one or more aspects of objects on the conveyor 740, e.g., the aerial vehicle 710-1, when such objects are within a field of view of the imaging device 750. Additionally, the acoustic speaker 770 is configured to project energy in the form of sounds at one or more frequencies $f_i$, and at any level of intensity, upon one or more portions of the aerial vehicle 710-1. Alternatively, an excitation source configured to excite the aerial vehicle 710-1 at known, selected frequencies of a range with the aerial vehicle 710-1 within a field of view of the imaging device 750, other than an acoustic speaker, may be utilized.

As is discussed above, a vibrometric signature generated for the aerial vehicle 710-1, e.g., upon its initial construction or at any other time, may be compared to a vibrometric signature associated with the one or more aerial vehicles 710-$n$ of the class. As is shown in FIG. 7B, a vibrometric signature 70-1 generated for the aerial vehicle 710-1 based on images captured using the imaging device 750 when the aerial vehicle 710-1 was subjected to excitation by the acoustic speaker 770 includes a plurality of natural frequencies $(f_N)_1$, $(f_N)_2$, $(f_N)_3$, $(f_N)_4$ of excitation at which vibration energies are observed with absolute or relative maximum levels of power (or energy). Where the vibrometric signature 70-1 is determined to be consistent with a vibrometric signature 70-$n$ associated with the class of aerial vehicles 710-$n$, which includes the plurality of natural frequencies $(f_N)_1$, $(f_N)_2$, $(f_N)_3$, $(f_N)_4$ of excitation, the construction of the aerial vehicle 710-1 is determined to be satisfactory, and the aerial vehicle 710-1 may be cleared to perform one or more missions of any type or form that may be performed by aerial vehicles 710-$n$ of the class. The vibrometric signature 70-1 may be identified as consistent with the vibrometric signature 70-$n$ on any basis, including but not limited to values of the power levels (or energy levels) at frequencies within a defined range including the natural frequencies $(f_N)_1$, $(f_N)_2$, $(f_N)_3$, $(f_N)_4$, or on any other basis.

As is shown in FIG. 7C, however, where a vibrometric signature 70-2 generated for the aerial vehicle 710-1 includes a plurality of natural frequencies $(f_N)_5$, $(f_N)_6$, $(f_N)_7$, $(f_N)_8$ of excitation at which vibrations were observed with absolute or relative maximum levels of power or energy, and is thus inconsistent with the vibrometric signature 70-$n$, the construction of the aerial vehicle 710-1 may not be confirmed as satisfactory based on vibrometric signatures, and further inspections or maintenance may be required before the aerial vehicle 710-1 may be cleared to perform one or more missions.

Figure 8A:
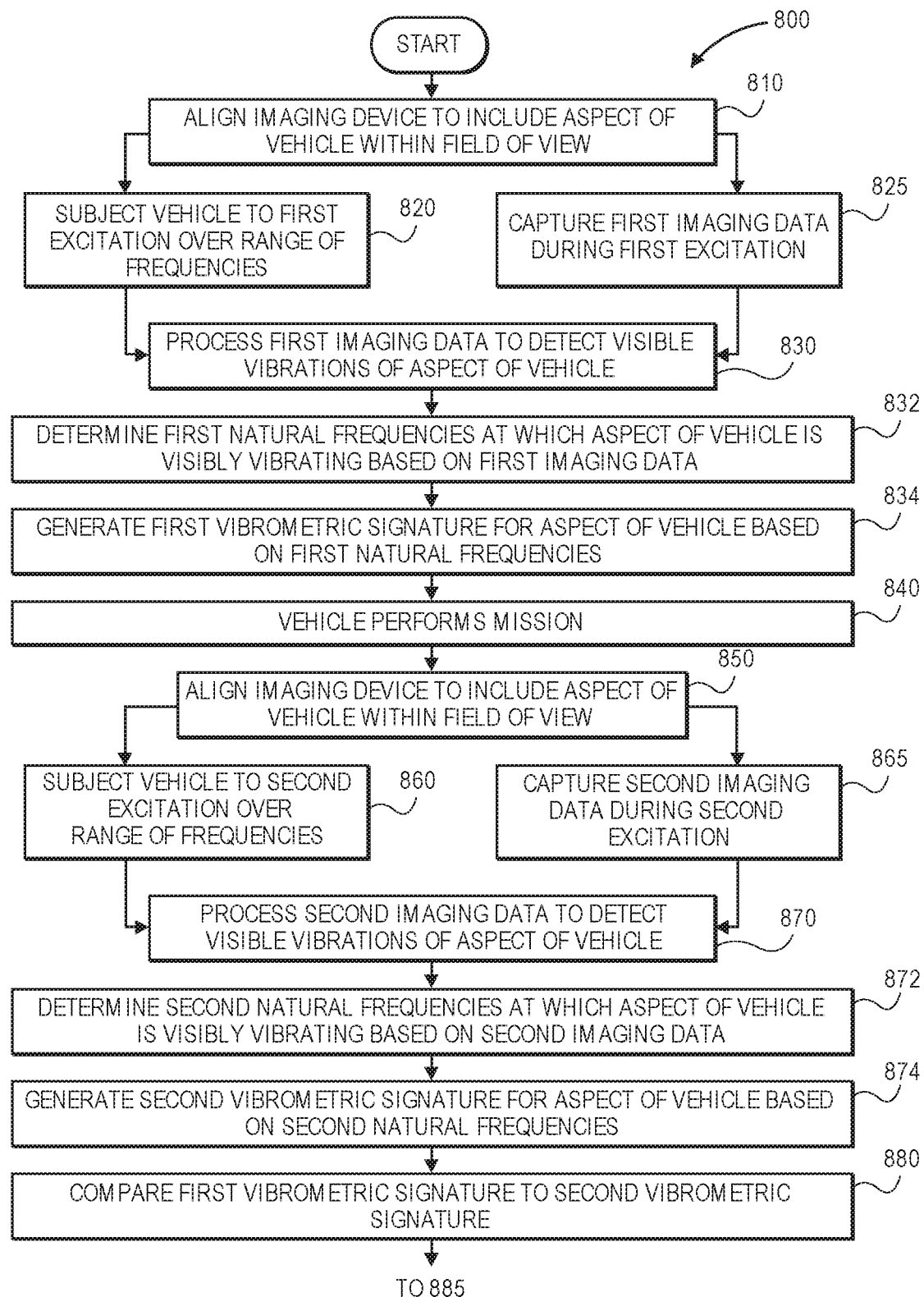
FIGS. 8A and 8B are a flow chart of one process for determining vehicle integrity using vibrometric signatures in accordance with embodiments of the present disclosure.
Figure 8B:
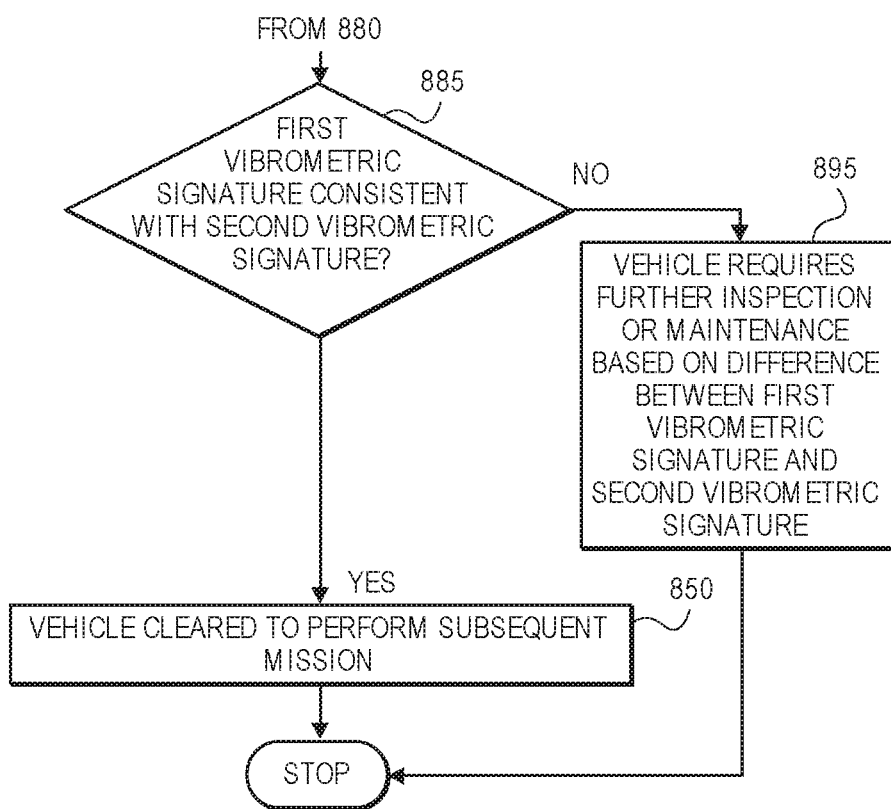

A vibrometric signature determined for a vehicle prior to the completion of a mission by the vehicle may also be compared to a vibrometric signature determined for the vehicle following the completion of the mission, in order to determine whether the vehicle was adversely affected by thrust or lift forces, flow conditions, impacts or other adverse events during the mission, which may cause the vehicle to exhibit different vibratory responses in the presence of excitation. Where the vibrometric signature determined for the vehicle corresponds to or is consistent with a vibrometric signature that is associated with a discrete anomaly, the vehicle may be understood or determined to be experiencing the discrete anomaly. Referring to FIGS. 8A and 8B, a flow chart 800 of one process for determining vehicle integrity using vibrometric signatures in accordance with embodiments of the present disclosure is shown. At box 810, an imaging device is aligned to include one or more aspects of a vehicle within a field of view. The aspect may have one or more uniquely visible textures, patterns, surfaces or markings, and the vehicle may be any type of vehicle, including but not limited to an aerial vehicle, or, alternatively, any other object.

At box 820, the vehicle is subjected to first excitation over a range of frequencies by an excitation source. In parallel, at box 825, first imaging data is captured by the imaging device during the first excitation. In some embodiments, the first imaging data is captured at a frame rate that is preferably at least twice the frequencies of the first excitation (e.g., at least twice a maximum frequency of the range, or at least as great as a Nyquist frequency).

At box 830, the first imaging data is processed to detect visible vibrations of the aspect of the vehicle, and at box 832, one or more first natural frequencies at which the aspect of the vehicle is visibly vibrating are determined based at least in part on the first imaging data. For example, the first imaging data may be processed according to one or more optical flow methods or techniques, or using one or more steerable filters or other techniques, to determining an extent of vibration in response to the excitation at a given frequency, and to estimate a power level associated with the vibration. The first natural frequencies may correspond to frequencies at which the power levels associated with the vibration are above a given threshold, or are otherwise at local or absolute maximum levels with respect to power levels associated with vibrations at other frequencies.

At box 834, a first vibrometric signature is generated for at least the aspect of the vehicle based at least in part on the natural frequencies determined at box 832. For example, the first vibrometric signature may include values of the natural frequencies, or values of both the natural frequencies and power levels associated with vibration at such frequencies. Alternatively, the first vibrometric signature may include power levels associated with vibration at each of a plurality of frequencies within the defined range (e.g., a plot of the power levels versus frequency), or any other indication or representation of at least the first natural frequencies.

At box 840, the vehicle performs a mission, such as a delivery of a payload from one location to another location, performing one or more law enforcement or surveillance operations, transiting from one location to another location, or undertaking any other mission.

Following the mission, at box 850, an imaging device is aligned to include the aspect of the vehicle within its field of view, such as is described above with regard to box 810. At box 860, the vehicle is subjected to second excitation over a range of frequencies by an excitation source, and in parallel, at box 865, second imaging data is captured by the imaging device during the second excitation, e.g., at a frame rate that is preferably at least twice the frequencies of the second excitation, or at least as great as a Nyquist frequency for the imaging device. In some embodiments, the second excitation may occur over the same range of frequencies or with the same intensities as the first excitation at box 820, or within a field of view of the same imaging device that captured the first imaging data at box 825. In some other embodiments, however, the second excitation may occur over a different range of frequencies or with different intensities as the first excitation, or within a field of view of a different imaging device.

At box 870, the second imaging data is processed to detect visible vibrations of the vehicle depicted therein, e.g., according to the same methods or techniques by which the first imaging data was processed at box 830, or according to one or more different methods or techniques. At box 872, one or more second natural frequencies at which the aspect of the vehicle is visibly vibrating are determined based at least in part on the second imaging data, and at box 874, a second vibrometric signature is generated for at least the aspect of the vehicle based at least in part on the natural frequencies determined at box 872.

At box 880, the first vibrometric signature is compared to the second vibrometric signature, and at box 885, whether the first vibrometric signature is consistent with the second vibrometric signature is determined. For example, natural frequencies of each of the first vibrometric signature and the second vibrometric signature may be compared to one another in order to determine whether the vehicle is responding to excitation in the same manner after the mission as it did prior to the mission. Alternatively, natural frequencies and levels of power or energy associated with vibrations at such frequencies may be compared, e.g., using plots of power levels or energy levels versus frequencies over a defined range of frequencies. Vibrometric signatures may be compared to one another in order to determine whether such signatures are consistent in any manner.

If the first vibrometric signature is determined to be consistent with the second vibrometric signature, then the process advances to box 890, where the vehicle is cleared to perform one or more subsequent missions, and the process ends. In some embodiments, one or more indications of the condition of the vehicle may be generated and/or stored in one or more data stores. If the first vibrometric signature is inconsistent with the second vibrometric signature, however, then the process advances to box 895, where the vehicle is subject to further inspections or maintenance based on the difference between the first vibrometric signature and the second vibrometric signature, and the process ends. For example, the vehicle may be blocked from performing one or more subsequent missions, if necessary, until one or more repairs or diagnoses are made.

In some embodiments, a vibrometric signature generated for a vehicle based on imaging data captured during excitation may be compared not to vibrometric signatures that were previously generated for the vehicle, or vibrometric signatures associated with vehicles of a common class, but with vibrometric signatures that are known to be consistent with specific anomalies or conditions of the vehicle. For example, a vibrometric signature generated for a vehicle may also be compared to one or more vibrometric signatures generated based on imaging data captured during the excitation of other vehicles that were experiencing one or more discrete anomalies, which caused the vehicles to exhibit different vibratory responses in the presence of excitation. Where the vibrometric signature determined for the vehicle corresponds to or is consistent with a vibrometric signature that is associated with a discrete anomaly, the vehicle may be understood or determined to be experiencing the discrete anomaly.

Figure 9:
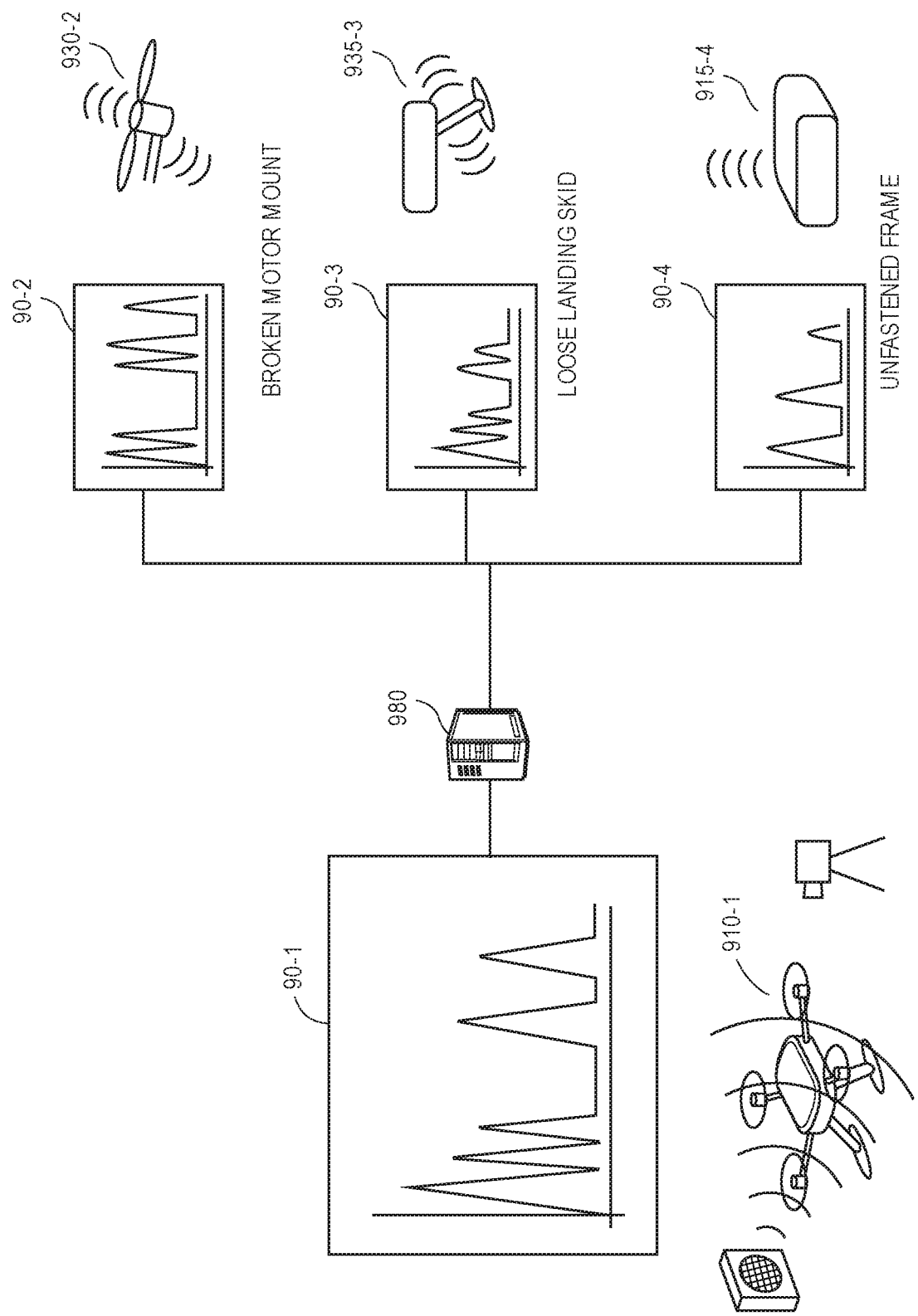
FIG. 9 is a view of aspects of one system for determining vehicle integrity using vibrometric signatures in accordance with embodiments of the present disclosure.

Referring to FIG. 9, a view of aspects of one system for determining vehicle integrity using vibrometric signatures in accordance with embodiments of the present disclosure are shown. Except where otherwise noted, reference numerals preceded by the number "9" shown in FIG. 9 indicate components or features that are similar to components or features having reference numerals preceded by the number "7" shown in FIGS. 7A through 7C, by the number "5" shown in FIGS. 5A through 5C, by the number "4" shown in FIGS. 4A through 4C, by the number "2" shown in FIG. 2 or by the number "1" shown in FIGS. 1A through 1E.

As is shown in FIG. 9, a vibrometric signature 90-1 is calculated for an aerial vehicle 910-1 after the aerial vehicle 910-1 has completed flight operations. The vibrometric signature 90-1 includes a plot or another representation of power or energy levels encountered following excitation over a range of frequencies, and includes local or absolute maximum power or energy levels at discrete natural frequencies of vibration. Alternatively, the vibrometric signature 90-1 may be defined to include slopes or derivatives of power levels or energy levels around the natural frequencies.

The vibrometric signature 90-1 may be compared to a plurality of other vibrometric signatures, each of which is generated following excitation of vehicles that are experiencing discrete anomalies. The vibrometric signature 90-1 may be compared to each of the vibrometric signatures 90-2, 90-3, 90-4 to determine whether the aerial vehicle 910-1 is experiencing any of the anomalies associated with the respective vibrometric signatures 90-2, 90-3, 90-4.

For example, as is shown in FIG. 9, the vibrometric signature 90-2 is generated based on imaging data captured by an imaging device 950 in communication with a server 980 during the excitation of a motor 930-2 that is connected to an aerial vehicle by a broken motor mount. The vibrometric signature 90-3 is generated based on imaging data captured during the excitation of a landing skid 935-3 that is loosely connected to an aerial vehicle. The vibrometric signature 90-4 is generated based on imaging data captured during the excitation of a frame 915-4 of an aerial vehicle that is not properly fastened.

Where the vibrometric signature 90-1 is consistent with or sufficiently similar to one of the vibrometric signatures 90-2, 90-3, 90-4, e.g., where the values of natural frequencies of vibration of the vibrometric signature 90-1 are substantially equal to the values of natural frequencies of vibration of one of the vibrometric signatures 90-2, 90-3, 90-4, the aerial vehicle 910-1 may be determined to be experiencing the discrete anomaly associated with the one of the vibrometric signatures 90-2, 90-3, 90-4. For example, as is shown in FIG. 9, because the vibrometric signature 90-1 is consistent with or sufficiently similar to the vibrometric signature 90-2, the aerial vehicle 910-1 may be presumed to have a broken motor mount, and further inspections or maintenance may be required. In some embodiments, the server 980 may be programmed with information or data regarding the vibrometric signatures 90-2, 90-3, 90-4, and may, upon receiving the vibrometric signature 90-1 or information or data regarding power or energy levels observed during excitation of the aerial vehicle 910-1 over a range of frequencies, the server 980 may be configured to compare the vibrometric signature 90-1 or the information or data to one or more of the vibrometric signatures 90-2, 90-3, 90-4. Alternatively, one or more processors provided aboard the imaging device 950 may be programmed with information or data regarding the vibrometric signatures 90-2, 90-3, 90-4, and configured to perform such a comparison.

Figure 10A:
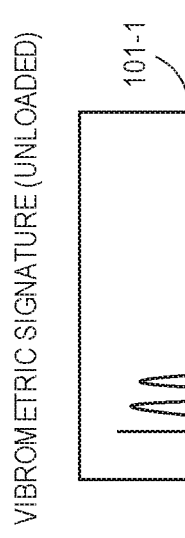
FIGS. 10A through 10C are views of aspects of one system for determining vehicle integrity using vibrometric signatures in accordance with embodiments of the present disclosure.
Figure 10A:
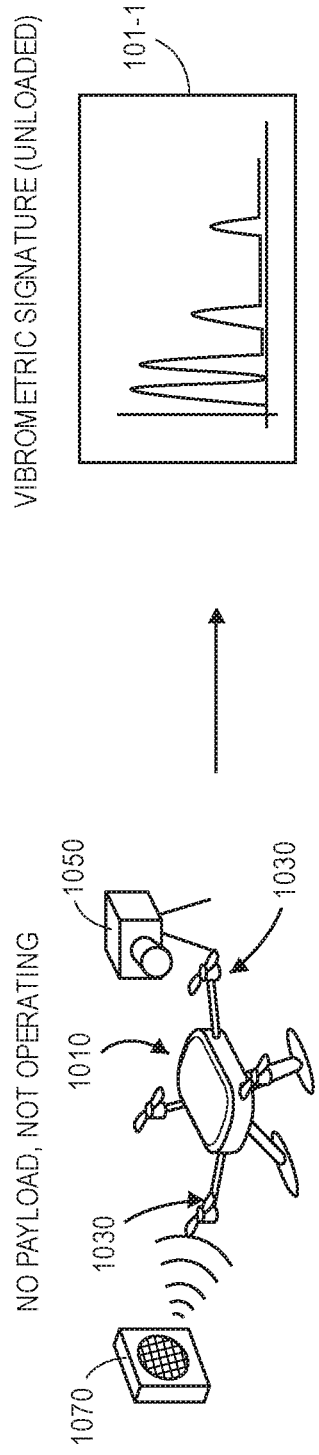
Figure 10B:
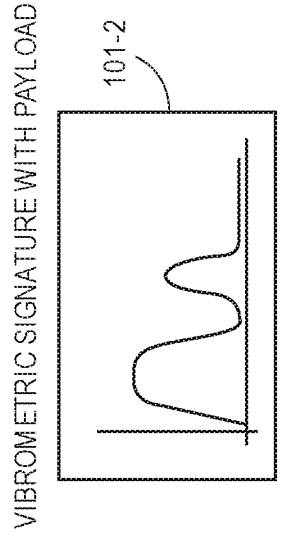
Figure 10B:
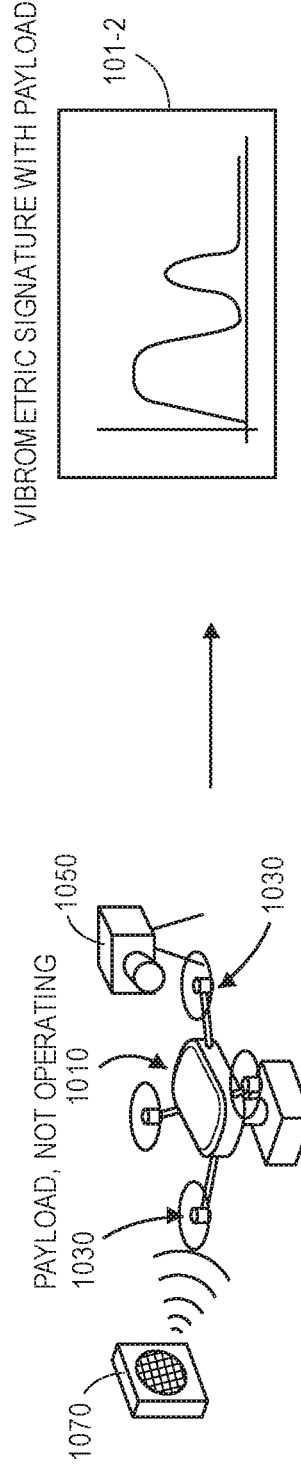
Figure 10C:
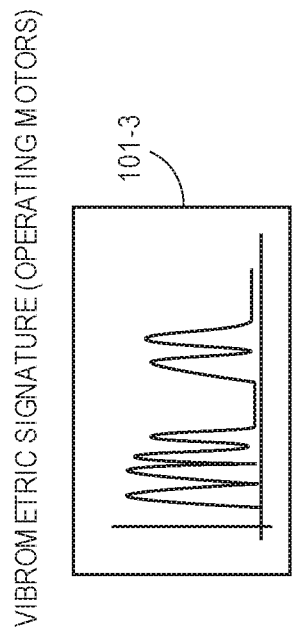
Figure 10C:
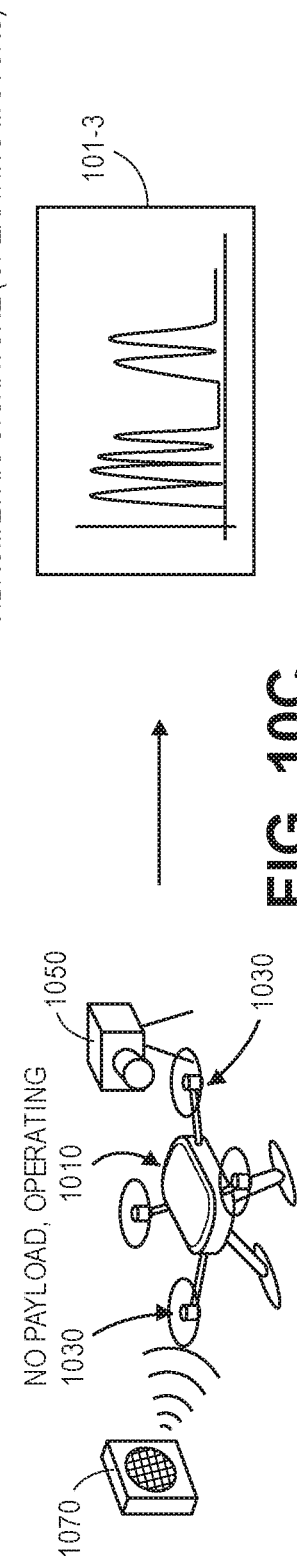

Because an object's vibrational properties may vary based on its structural properties, such as geometry, stiffness or damping, or the placement of individual components, a vehicle may have different vibrometric signatures when the vehicle is operating subject to a number of different conditions. Referring to FIGS. 10A through 10C, a view of aspects of one system for determining vehicle integrity using vibrometric signatures in accordance with embodiments of the present disclosure are shown. Except where otherwise noted, reference numerals preceded by the number "10" shown in FIGS. 10A through 10C indicate components or features that are similar to components or features having reference numerals preceded by the number "9" shown in FIG. 9, by the number "7" shown in FIGS. 7A through 7C, by the number "5" shown in FIGS. 5A through 5C, by the number "4" shown in FIGS. 4A through 4C, by the number "2" shown in FIG. 2 or by the number "1" shown in FIGS. 1A through 1E.

As is shown in FIG. 10A, an aerial vehicle 1010 includes a plurality of propulsion motors 1030. In accordance with the present disclosure, and as is discussed above, a vibrometric signature 101-1 is generated based on imaging data captured using an imaging device 1050 as the aerial vehicle 1010 is subject to excitation over a defined range of frequencies by an acoustic speaker 1070 or another excitation source, with the propulsion motors 1030 not operating, and the aerial vehicle 1010 not engaged with any payload. The vibrometric signature 101-1 indicates levels of power or energy of vibration observed at frequencies of a defined range, including one or more local or absolute maximum power or energy levels at natural frequencies of vibration.

As is shown in FIG. 10B, when the aerial vehicle 1010 is engaged with a payload 1045, and subjected to acoustic excitation over a defined range of frequencies by the acoustic speaker 1070, a vibrometric signature 101-2 generated based on imaging data captured using the imaging device 1050 indicates levels of power or energy of vibration at frequencies of a defined range that are different from the levels of power or energy of vibration represented in the vibrometric signature 101-1, due to differences in the structural properties of the aerial vehicle 1010 resulting from its engagement with the payload 1045. Likewise, as is shown in FIG. 10C, when the propulsion motors 1030 of the aerial vehicle 1010 are operating, and subjected to acoustic excitation over a defined range of frequencies by the acoustic speaker 1070, a vibrometric signature 101-3 generated based on imaging data captured using the imaging device 1050 indicates levels of power or energy of vibration at frequencies of a defined range that are different from the levels of power or energy of vibration represented in the vibrometric signatures 101-1, 101-2 due to differences in the structural properties of the aerial vehicle 1010 resulting from the operation of the propulsion motors 1030. Alternatively, in some embodiments, the one or more propulsion motors 1030 may act as an excitation source for the aerial vehicle 1010, such as where the one or more motors 1030 may be manipulated or controlled to generate vibration or other excitation at known, selected frequencies with the aerial vehicle 1010 within a field of view of the imaging device 1050.

Figure 11:
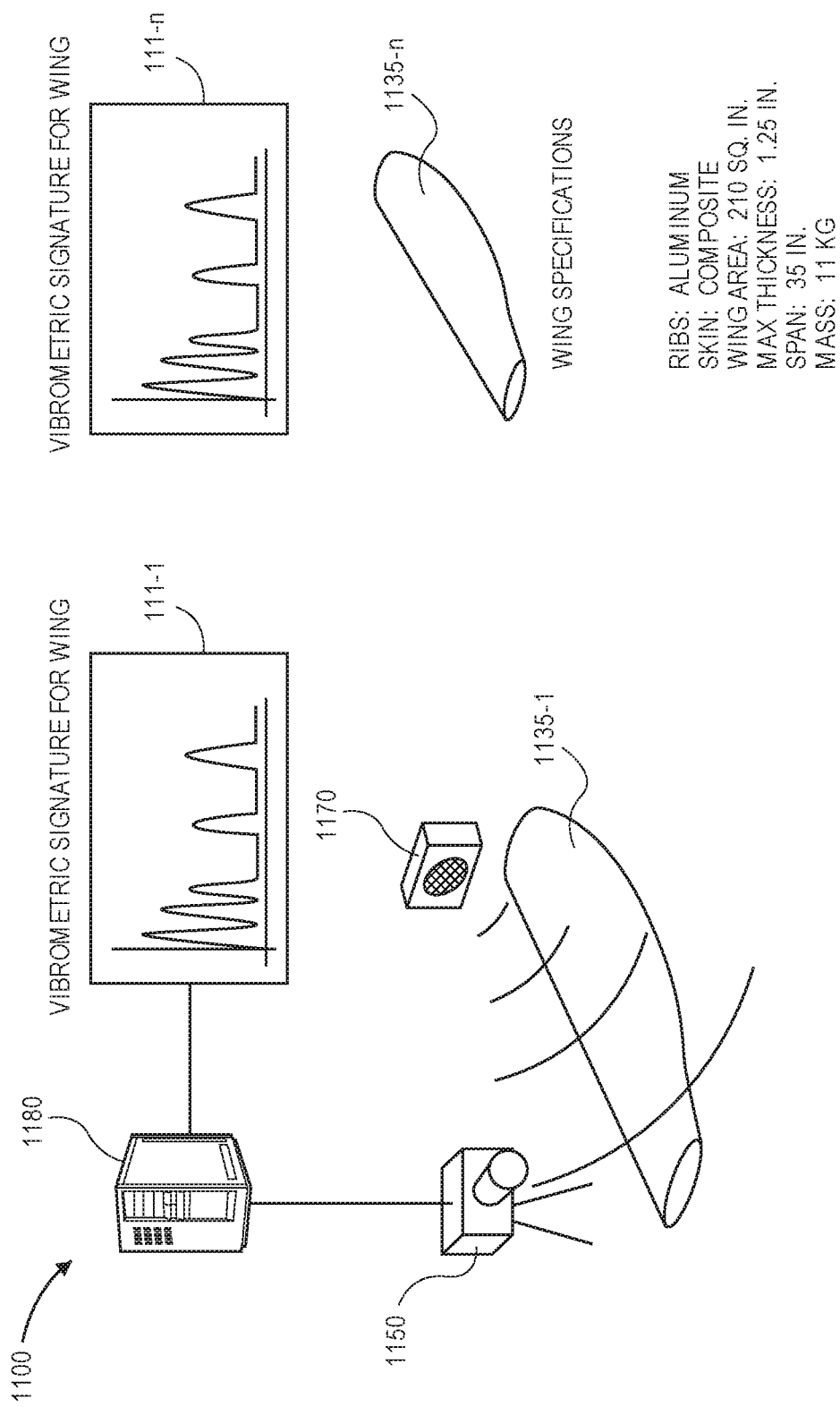
FIG. 11 is a view of aspects of one system for determining vehicle integrity using vibrometric signatures in accordance with embodiments of the present disclosure.

One or more of the embodiments of the present disclosure may be further utilized to determine the integrity of objects other than vehicles, such as discrete components of vehicles. For example, where a discrete component of a vehicle such as a motor, a control surface, or any other component, is constructed according to a standard procedure or set of specifications, and from a designated set of materials or parts, a vibrometric signature determined for the discrete component may be compared to one or more vibrometric signatures that are expected or components constructed according to the standard procedure or the set of specifications, and from the same designated set of materials or parts. Referring to FIG. 11, a view of aspects of one system 1100 for determining vehicle integrity using vibrometric signatures in accordance with embodiments of the present disclosure are shown. Except where otherwise noted, reference numerals preceded by the number "11" shown in FIG. 11 indicate components or features that are similar to components or features having reference numerals preceded by the number "10" shown in FIGS. 10A through 10C, by the number "9" shown in FIG. 9, by the number "7" shown in FIGS. 7A through 7C, by the number "5" shown in FIGS. 5A through 5C, by the number "4" shown in FIGS. 4A through 4C, by the number "2" shown in FIG. 2 or by the number "1" shown in FIGS. 1A through 1E.

As is shown in FIG. 11, the system 1100 includes a wing 1135-1, an imaging device 1150 and an acoustic speaker 1170. The imaging device 1150 is in communication with a server 1180 and aligned to include one or more portions of the wing 1135-1 within a field of view. The acoustic speaker 1170 is also aligned to project acoustic energy in the form of sounds at one or more frequencies $f_i$, at any level of intensity, upon one or more portions of the wing 1135-1. Alternatively, the acoustic speaker 1170 may be replaced or supplemented with any other type or form of excitation source that may excite the wing 1135-1 at known, selected frequencies with the aerial vehicle 1110 within a field of view of the imaging device 1150.

The wing 1135-1 may have been constructed according to a standard procedure or set of specifications, and from a designated set of materials or parts. For example, as is shown in FIG. 11, a wing 1135-n formed from the standard procedure or set of instructions, and from the designated set of materials or parts, has aluminum ribs and a composite skin, as well as a wing area of two hundred ten square inches (210 sq. in.), a maximum thickness of one-and-one-quarter inches (1.25 in), and a span of thirty-five inches (35 in.).

A vibrometric signature 111-1 generated based on imaging data captured using the imaging device 1150 during the excitation of the wing 1135-1 may be used to determine whether the construction of the wing 1135-1 is consistent with specifications of a wing 1135-n. For example, the vibrometric signature 111-1 may be compared with a vibrometric signature 111-n that was generated following the excitation of the wing 1135-n that has been confirmed to have been formed from the standard procedure or set of instructions, and from the designated set of materials or parts. If the vibrometric signature 111-1 is sufficiently similar to or consistent with the vibrometric signature 111-n, the wing 1135-1 may be confirmed to have been properly constructed from the standard procedure or set of instructions, and from the designated set of materials or parts. If the vibrometric signature 111-1 is not sufficiently similar to or consistent with the vibrometric signature 111-n, however, then the wing 1135-1 may require further examination or evaluation to determine whether the wing 1135-1 is adequate for use in an aerial vehicle.

Although the disclosure has been described herein using exemplary techniques, components, and/or processes for implementing the systems and methods of the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure.

For example, although some of the embodiments disclosed herein may reference the generation of vibrometric signatures for unmanned aerial vehicles that are configured to deliver payloads from warehouses or other like facilities to customers, those of ordinary skill in the pertinent arts will recognize that the systems and methods disclosed herein are not so limited, and may be utilized in connection with any type or form of vehicle (e.g., manned or unmanned) or component thereof that is configured for any intended industrial, commercial, recreational or other use.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the processes represented in the flow charts of FIGS. 3, 6 or 8A and 8B, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative embodiments thereof, the foregoing and various other additions and omissions may be made therein and thereto without departing from the spirit and scope of the present disclosure.

What is claimed is:

1. A system comprising:
an aerial vehicle;
an imaging device, wherein the aerial vehicle is within a field of view of the imaging device;
a speaker, wherein the speaker is aligned to emit acoustic energy onto the aerial vehicle; and a server in communication with each of the imaging device and the speaker,
wherein the server is configured to at least:
cause the speaker to project acoustic energy at a first frequency onto at least a portion of the aerial vehicle;
cause the imaging device to capture a first image, wherein the first image is captured with the acoustic energy projected onto the aerial vehicle at the first frequency;
determine, based at least in part on the first image, a first power level corresponding to vibration of the portion of the aerial vehicle with the acoustic energy projected onto the aerial vehicle at the first frequency;
cause the speaker to project acoustic energy at a second frequency onto at least the portion of the aerial vehicle;
cause the imaging device to capture a second image, wherein the second image is captured with the acoustic energy projected onto the aerial vehicle at the second frequency;
determine, based at least in part on the second image, a second power level corresponding to vibration of the portion of the aerial vehicle with the acoustic energy projected onto the aerial vehicle at the second frequency;
generate a first vibrometric signature for the aerial vehicle based at least in part on the first frequency, the first power level, the second frequency and the second power level;
determine whether the first vibrometric signature is consistent with a second vibrometric signature, wherein the second vibrometric signature was previously generated for at least the aerial vehicle; and
in response to determining that the first vibrometric signature is consistent with the second vibrometric signature, cause the aerial vehicle to perform one or more missions.

2. The system of claim 1, wherein the first image is one of a plurality of images captured with acoustic energy projected onto at least the portion of the aerial vehicle over a range of frequencies including the first frequency and the second frequency,
wherein the second image is one of the plurality of images, and
wherein the server is further configured to at least:
determine that the first power level is greater than the second power level; and
in response to determining that the first power level is greater than the second power level,
determine that the first frequency is a first natural frequency, and wherein the first power level is one of a local maximum power level or an absolute maximum power level of vibration of the aerial vehicle over the range of frequencies.

3. The system of claim 2, wherein each of the first power level and the second power level is determined according to at least one of:
an optical flow technique; or
a steerable filter-based technique.

4. A method comprising:
subjecting at least a first portion of a first object to excitation by an external source over a first period of time;
capturing a first plurality of images by an imaging device including at least the first portion of the first object within a first field of view, wherein the first plurality of images is captured with the first portion of the first object being subjected to the excitation by the external source over at least a portion of the first period of time;
determining at least a first natural frequency of the first portion of the first object based at least in part on the first plurality of images;
identifying at least a second natural frequency associated with one of the first portion or the first object;
generating a comparison of at least the first natural frequency to at least the second natural frequency;
determining an indication of suitability of at least one of the first portion or the first object based at least in part on the comparison; and storing at least the indication of suitability in at least one data store.

5. The method of claim 4, further comprising:
generating at least a first vibrometric signature based at least in part on the first natural frequency, and
wherein identifying at least the second natural frequency comprises:
identifying a second vibrometric signature associated with the one of the first portion or the first object, wherein the second vibrometric signature comprises the second natural frequency, and
wherein generating the comparison of at least the first natural frequency to at least the second natural frequency comprises:
generating a comparison of at least the first vibrometric signature to at least the second vibrometric signature, and
wherein determining the indication of suitability of the at least one of the first portion or the first object based at least in part on the comparison comprises:
determining that the first vibrometric signature is consistent with the second vibrometric signature.

6. The method of claim 5, wherein determining at least the first natural frequency comprises:
determining a first plurality of natural frequencies of at least the first portion of the first object based at least in part on the first plurality of images, wherein the first natural frequency is one of the first plurality of natural frequencies, wherein generating at least the first vibrometric signature comprises:
generating at least the first vibrometric signature based at least in part on the first plurality of natural frequencies, wherein the second vibrometric signature comprises a second plurality of natural frequencies, and
wherein the second natural frequency is one of the second plurality of natural frequencies.

7. The method of claim 5, wherein the second vibrometric signature corresponds to a class of objects including the first object,
wherein determining the indication of suitability of the at least one of the first portion or the first object based at least in part on the comparison comprises:
in response to determining that the first vibrometric signature is consistent with the second vibrometric signature,
determining that the at least one of the first portion of the first object or the first object is capable of performing one or more operations.

8. The method of claim 7, further comprising:
identifying a plurality of vibrometric signatures, wherein each of the plurality of vibrometric signatures corresponds to one of at least some of the first objects of the class,
wherein the second natural frequency is at least one of:
a mean natural frequency of at least one of the plurality of vibrometric signatures; or
a maximum natural frequency of at least one of the plurality of vibrometric signatures.

9. The method of claim 5, wherein at least the second vibrometric signature corresponds to at least one of a plurality of anomalies associated with at least one object,
wherein determining the indication of suitability of the at least one of the first portion or the first object based at least in part on the comparison comprises:
in response to determining that the first vibrometric signature is consistent with the second vibrometric signature,
determining that at least one of the first portion or the first object is experiencing the at least one of the plurality of anomalies.

10. The method of claim 5, wherein at least the second vibrometric signature corresponds to a second portion of at least a second object,
wherein the second portion of at least the second object has a plurality of structural properties including at least one of a predetermined density, a predetermined stiffness or a predetermined material, and
wherein determining the indication of suitability of the at least one of the first portion or the first object based at least in part on the comparison comprises:
in response to determining that the first vibrometric signature is consistent with the second vibrometric signature,
determining that the first portion of the first object has at least one of the plurality of structural properties.

11. The method of claim 5, wherein subjecting at least the first portion of the first object to the excitation by the external source comprises:
projecting acoustic energy over a range of acoustic frequencies onto at least the first portion of the first object by the external source over the first period of time, and
wherein determining at least the first natural frequency of the first portion of the first object comprises:
detecting resonance of at least the first portion of the first object within at least a first image of the first plurality of images, wherein the first image is captured at a first time, wherein the first time is within the period of time; and
determining an acoustic frequency associated with the excitation by the external source at the first time, wherein the first natural frequency is the acoustic frequency associated with the excitation by the external source at the first time.

12. The method of claim 5, wherein each of the first plurality of images is captured at a frame rate not less than at least twice the first natural frequency.

13. The method of claim 5, wherein determining at least the first natural frequency of the first portion of the first object comprises:
detecting at least the first portion of the first object within a first image captured at a first time, wherein the first image is one of the first plurality of images;
detecting at least the first portion of the first object within a second image captured at a second time, wherein the second image is one of the first plurality of images;
determining a displacement of at least the first portion of the first object based at least in part on the first image and the second image; and
determining at least the first natural frequency of the first portion of the first object based at least in part on the displacement and a difference between the first time and the second time.

14. The method of claim 13, wherein the displacement of at least the first portion of the first object is determined according to at least one of an optical flow technique or a steerable filter-based technique.

15. The method of claim 4, wherein the first object is a vehicle.

16. The method of claim 15, wherein the first portion of the first object is at least one of:
an aileron;
a bracket;
an elevator;
an elevon;
a junction;
a rudder;
a strut;
a taileron; or
a wing.

17. The method of claim 15, further comprising:
subjecting at least the first portion of the first object to excitation by the external source over a second period of time, wherein the second period of time precedes the first period of time;
capturing a second plurality of images by the imaging device, wherein the second plurality of images is captured with the first portion of the first object being subjected to the excitation by the external source over the second period of time; and
determining at least the second natural frequency associated with the one of the first portion or the first object based at least in part on the second plurality of images,
wherein the first object conducted at least one mission between the second period of time and the first period of time.

18. The method of claim 4, wherein the first object comprises a motor, and
wherein subjecting at least the first portion of the first object to the excitation by the external source comprises:
operating the motor at a first rotational speed during the first period of time; and
operating the motor at a second rotational speed during the first period of time,
wherein determining at least the first natural frequency of the first portion of the first object based at least in part on the first imaging data comprises:
determining the first natural frequency of the first portion of the first object based at least in part on a portion of the imaging data captured with the motor operating at the first rotational speed and a portion of the imaging data captured with the motor operating at the second rotational speed.

19. A method comprising:

emitting acoustic energy at each of a plurality of frequencies by a speaker, wherein the speaker is aligned to project the acoustic energy upon at least a portion of an object;

capturing, with the speaker emitting the acoustic energy at each of the frequencies, a plurality of images by an imaging device including at least the portion of the object within a field of view;

determining, for each of the discrete frequencies, a power level of vibration by at least the portion of the object based at least in part on the plurality of images captured by the imaging device at each of the discrete frequencies;

generating a first vibrometric signature for the object based at least in part on the power levels of vibration at each of the plurality of frequencies, wherein the first vibrometric signature comprises a first natural frequency having a local or absolute maximum power level of vibration;

identifying a plurality of vibrometric signatures, wherein each of the plurality of vibrometric signatures is associated with one of a plurality of anomalies;

determining that at least a second natural frequency of a second vibrometric signature is consistent with at least the first natural frequency of the first vibrometric signature, wherein the second vibrometric signature is one of the plurality of vibrometric signatures; and in response to determining that at least the second natural frequency of the second vibrometric signature is consistent with at least the first natural frequency of the first vibrometric signature, identifying one of the plurality of anomalies associated with the second vibrometric signature; and determining that the object is experiencing the one of the plurality of anomalies.

20. The method of claim 19, wherein the acoustic energy is emitted at the plurality of frequencies selected according to a step function, and wherein the plurality of images comprises at least one image captured at one of the plurality of frequencies.

* * * * *